US012147057B2

United States Patent
Makinen

(10) Patent No.: US 12,147,057 B2
(45) Date of Patent: Nov. 19, 2024

(54) METHOD FOR ENHANCING THE IMAGE OF AUTOSTEREOSCOPIC 3D DISPLAYS BASED ON ANGULAR FILTERING

(71) Applicant: InterDigital Madison Patent Holdings, SAS, Paris (FR)

(72) Inventor: Jukka-Tapani Makinen, Oulu (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/619,182

(22) PCT Filed: Jun. 17, 2020

(86) PCT No.: PCT/US2020/038172
§ 371 (c)(1),
(2) Date: Dec. 14, 2021

(87) PCT Pub. No.: WO2020/257307
PCT Pub. Date: Dec. 24, 2020

(65) Prior Publication Data
US 2022/0308356 A1 Sep. 29, 2022

Related U.S. Application Data

(60) Provisional application No. 62/864,846, filed on Jun. 21, 2019.

(51) Int. Cl.
*G02B 5/28* (2006.01)
*G02B 27/30* (2006.01)
(Continued)

(52) U.S. Cl.
CPC .............. *G02B 27/30* (2013.01); *G02B 5/288* (2013.01); *G02B 27/4205* (2013.01);
(Continued)

(58) Field of Classification Search
CPC .... G02B 27/30; G02B 5/288; G02B 27/4205; G02B 27/46; G02B 30/37; H03N 13/305
(Continued)

(56) References Cited

U.S. PATENT DOCUMENTS 5,606,436 A * 2/1997 Shapiro ............ G02F 1/133526
349/110
6,064,424 A 5/2000 Van et al.
(Continued)

FOREIGN PATENT DOCUMENTS

EP 2146237 A1 1/2010
EP 3441859 A1 2/2019
(Continued)

OTHER PUBLICATIONS

Holovizio Natural 3D Displaying, www.holografika.com/Documents/HoloVizio_C80.pdf, available at Internet Archive Aug. 22, 2017, https://web.archive.org/web/20170822004618/http://www.holografika.com/Documents/HoloVizio_C80.pdf (last accessed Aug. 23, 2021)(1 pages).
(Continued)

*Primary Examiner* — Audrey Y Chang
(74) *Attorney, Agent, or Firm* — Smadar Gefen

(57) ABSTRACT

Embodiments include 3D display devices and methods of operation. In an example device, a light-emitting layer is provided with an addressable array of light-emitting elements. An optical layer overlays the light-emitting layer. The optical layer includes an array of lenses operative to substantially collimate light from the light-emitting layer. To suppress stay light, an angular filter layer is provided along an optical path from the light-emitting layer to an exterior of the display. The angular filter is operative to substantially block light having an incident angle greater than a threshold angle and to substantially transmit light having an incident
(Continued)

angle less than a threshold angle. The angular filter may be a thin-film interference bandpass filter. Different regions of the angular filter may be tuned for different wavelengths of light.

17 Claims, 22 Drawing Sheets

(51) Int. Cl.
  *G02B 27/42*   (2006.01)
  *G02B 27/46*   (2006.01)
  *G02B 30/27*   (2020.01)
  *H04N 13/305*   (2018.01)

(52) U.S. Cl.
  CPC ............. *G02B 27/46* (2013.01); *G02B 30/27* (2020.01); *H04N 13/305* (2018.05)

(58) Field of Classification Search
  USPC ........................................ 359/463, 589, 462
  See application file for complete search history.

(56) References Cited

U.S. PATENT DOCUMENTS

| | | | |
|---|---|---|---|
| 6,118,584 | A | 9/2000 | Van et al. |
| 6,999,071 | B2 | 2/2006 | Balogh |
| 7,573,491 | B2 | 8/2009 | Hartkop et al. |
| 7,903,183 | B2 | 3/2011 | Jacobs et al. |
| 7,961,182 | B2 | 6/2011 | Tachi et al. |
| 8,045,069 | B2 | 10/2011 | Ijzerman et al. |
| 8,328,360 | B2 | 12/2012 | Gao et al. |
| 8,502,816 | B2 | 8/2013 | Butler et al. |
| 8,848,006 | B2 | 9/2014 | Wetzstein et al. |
| 9,298,168 | B2 | 3/2016 | Taff et al. |
| 9,651,734 | B2 | 5/2017 | Gollier |
| 2001/0048536 | A1* | 12/2001 | Lehmann ........... H04N 1/02815 358/513 |
| 2003/0176214 | A1 | 9/2003 | Burak et al. |
| 2007/0247708 | A1* | 10/2007 | De Zwart ............ H04N 13/317 359/462 |
| 2011/0032398 | A1* | 2/2011 | Lenchenkov ..... H01L 27/14621 257/E31.127 |
| 2012/0038848 | A1 | 2/2012 | Nagato et al. |
| 2012/0062991 | A1* | 3/2012 | Krijn ..................... H04N 13/312 359/463 |
| 2013/0182234 | A1* | 7/2013 | Graupner ............ G03F 7/70308 355/71 |
| 2016/0116752 | A1 | 4/2016 | Wu |
| 2016/0212414 | A1 | 7/2016 | Chen |
| 2017/0111633 | A1 | 4/2017 | Kang et al. |
| 2018/0131926 | A1 | 5/2018 | Shanks et al. |
| 2018/0324413 | A1 | 11/2018 | Koerber et al. |
| 2019/0377114 | A1* | 12/2019 | Wheatley ................. G02B 5/28 |

FOREIGN PATENT DOCUMENTS

| | | |
|---|---|---|
| GB | 2472444 A | 2/2011 |
| JP | 2012528346 A | 11/2012 |
| WO | WO2009009779 A2 | 1/2009 |
| WO | WO2011085144 A1 | 7/2011 |
| WO | WO2011149641 A2 | 12/2011 |
| WO | WO2018075640 A1 | 4/2018 |

OTHER PUBLICATIONS

Takaki, "High-Density Directional Display for Generating Natural Three-Dimensional Images". Proceedings of the IEEE, vol. 94, No. 3, Mar. 2006, pp. 654-663.

Fattal et. al. "A Multi-Directional Backlight for A Wide-Angle, Glasses-Free Three-Dimensional Display". Nature, vol. 495, Mar. 21, 2013, pp. 348-351.

Ramachandra et. al., "Spatio-Angular Sharpening for Multiview 3D Displays", ICASSP 2010, 4 pages.

Kim, et. al., "Light-Extraction Enhancement of GaInN Light-Emitting Diodes by Graded-Refractive-Index Indium Tin Oxide Anti-Reflection Contact"; Advanced Materials, 20:801, (2008), 5 pages.

Maimone et al., "Focus 3D: Compressive Accommodation Display". ACM Transactions on Graphics, vol. 32, No. 5, Article 153, Sep. 2013, pp. 1-13.

Yue et al., "Optical Design and Study of High-performance Lamination Organic Light Emitting Device", Chinese Excellent Dissertations of Master's Degree, Aug. 31, 2015, 146 pages.

* cited by examiner

METHOD FOR ENHANCING THE IMAGE OF AUTOSTEREOSCOPIC 3D DISPLAYS BASED ON ANGULAR FILTERING

CROSS-REFERENCE TO RELATED APPLICATIONS

The present application is a national stage application under 35 U.S.C. § 371 of International Application No. PCT/US2020/038172, entitled "METHOD FOR ENHANCING THE IMAGE OF AUTOSTEREOSCOPIC 3D DISPLAYS BASED ON ANGULAR FILTERING," filed on Jun. 17, 2020, which claims benefit under 35 U.S.C. § 119(e) from U.S. Provisional Patent Application Ser. No. 62/864,846, entitled "Method for Enhancing The Image Of Autostereoscopic 3D Displays Based on Angular Filtering," filed Jun. 21, 2019, which is hereby incorporated by reference in its entirety.

BACKGROUND

There are various different display solutions for presenting three-dimensional (3D) images. A division based on hardware may be made between systems utilizing glasses or goggles and systems that may be used without them. In both of these, there are technologies that allow multiple users and technologies that work only for a single user. However, only goggleless displays may offer a truly shared user experience without obstructing structures that, at least to some degree, isolate the viewer from the surrounding real world. With head mounted displays (HMDs), the level of isolation ranges from complete blockage of the natural view, which is the property of all virtual reality (VR) systems, to the mildly obstructing visors or lightguides placed in front of the eyes that allow augmented reality (AR) and mixed reality (MR) user experiences. Head mounted devices, however, will always be putting the viewer behind a "looking glass" or a "window" that makes the experience feel artificial.

Overall, goggleless 3D display solutions are technically more challenging than systems with some kind of headgear. This is due to the fact that all visual information that a person may use enter the human visual perception system through the eye pupils. HMDs have the great advantage of being very close to the eyes and they may cover a large Field-Of-View (FOV) with much more compact optical constructions than what is possible with any goggleless displays. They may also be more efficient in producing the needed amount of light as the "viewing window" is small and well defined in a relatively fixed position. The goggleless displays will generally be physically large if one wants to cover a significant portion of the viewer's FOV, and the systems may become much more expensive to make than goggles. As the user position is not fixed to the display device, the projected images are spread over a large angular range in order to make the picture visible from multiple positions, which easily leads to a situation where most of the emitted light is wasted. This is especially challenging with mobile devices that have a very limited battery life and may be used in environments where providing display image contrast calls for high display brightness when the ambient light levels are high.

HMDs may also use much less 3D image data than goggleless devices. A single user will not need more than one stereoscopic viewpoint to the 3D scene as the display system attached to the head moves together with the eyes. In contrast, the user without goggles is free to change position around the 3D display, and the system generally provides several different views' of the same 3D scenery. This multiplies the amount of 3D image information to be processed. One approach to ease the burden of heavy data handling with goggleless displays is to use specialized eye tracking systems in order to determine the position and line of sight of the user(s). In this case the 3D sub-images may be directed straight towards the pupils and not spread out to the whole surrounding space. By knowing the position of the eyes, the "viewing window" size may be reduced enormously. In addition to lowering the amount of data, the eye tracking may also be used for reducing power consumption as the light may be emitted towards the eyes only. This technique comes with the price of using eye tracking and projection systems that use their own hardware and processing power, which may also limit the number of possible viewers due to the limited performance of the sub-system.

One well-known technique for presenting three-dimensional (3D) images is stereoscopy. In this method, two two-dimensional (2D) images are displayed separately to the left and right eye. In goggleless displays, the two views are commonly generated either by using a parallax barrier method or lenticular sheets that are able to limit the visibility of a pair of light emitting pixels in such a way that the pixels may be seen only with the designated eye. Perception of depth is created when matrices of these pixel pairs are used to create images taken from slightly different viewing angles, and the 3D image is combined in the brain. However, presentation of two 2D images is perceptually not the same thing as displaying an image in full 3D. One difference is the fact that head and eye movements will not give more information about the objects being displayed: the 2D images are able to present only the same two slightly different viewpoints. These types of systems are commonly called 3D displays, although stereoscopic displays would be the more accurate term. Many stereoscopic displays do not qualify as real 3D displays, but all real 3D displays are also stereoscopic, because they are able to present the image pairs to the two eyes of the viewer. The use of only two views may cause the 3D image to be "flipped" if the viewer moves to a wrong position in front of the display, or the 3D illusion does not spring up at all if the images are not visible to the correct eyes properly and the brain is not able to process the information. In a worst case, the viewer may even feel nauseated and a prolonged use of a low-quality display may lead to headaches and dizziness.

Multiview systems are displays that have taken a step forward from the common stereoscopic displays. In these devices, the light is emitted from a pixelated layer, and a microlens or lenticular sheet collimates the emitted light into a set of beams that exit the lens aperture at different propagation directions. The beam directions create the stereoscopic 3D effect when several unique views of the same 3D image are projected to the different directions by modulating the pixels according to the image content. If only two pixels are used for a 3D scene, the result is a stereoscopic image for a single user standing in the middle of the FOV. If more than two pixels are used under one microlens that defines the boundaries of a multiview display cell, the result is a set of unique views spread across the FOV, and multiple users may see the stereoscopic images at different positions inside the predefined viewing zone. Each viewer may have his/her own stereoscopic viewpoint to the same 3D content, and perception of a three-dimensional image is generated enabling a shared visual experience. As the viewers move around the display, the image is changed for each new viewing angle, making the 3D illusion much more robust and convincing also for individual viewers and improving the perceived display quality considerably.

With current relatively low-density multiview displays, the views change in a stepwise fashion as the viewer moves in front of the device. This feature lowers the quality of 3D experience and may even cause a breakup of the 3D perception. In order to mitigate this problem, some Super Multi View (SMV) techniques have been tested with as many as 512 views. The basic idea is to generate an extremely large number of views that make the transition between two viewpoints very smooth. If the light from at least two images from slightly different viewpoints enters the eye pupil almost simultaneously, a much more realistic visual experience follows. In this case, motion parallax effects resemble the natural conditions better as the brain unconsciously predicts the image change due to motion. The SMV condition may be met by reducing the spatial interval between two views at the correct viewing distance to a smaller value than the size of the eye pupil. Alternatively, the two images may be projected into the pupil of a single eye at slightly different points in time, but still inside the timeframe of human persistence-of-vision, in which case the images are perceived as continuous.

At nominal illumination conditions, the human pupil is generally estimated to be ~4 mm in diameter. If the ambient light levels are high (sunlight), the diameter may be as small as 1.5 mm and in dark conditions as large as 8 mm. The maximum angular density that may be achieved with SMV displays is generally limited by diffraction, and there is an inverse relationship between spatial resolution (pixel size) and angular resolution. Diffraction increases the angular spread of a light beam passing through an aperture, and this effect may be taken into account in the design of very high density SMV displays. This may become an issue in use cases where very small display pixels are used (e.g. mobile displays) and where the display is placed far away from the viewer. In practice, high angular view density is difficult to achieve with spatial multiplexing only, and an alternative is to use additional temporal multiplexing. In other words, if it is not possible to generate the high number of views simultaneously with adequate projected image quality, the SMV condition may still be met with a component or system that is capable of producing the views sequentially, but so fast that the human visual system perceives them as simultaneous.

Some multiview systems have been described that utilize only temporal multiplexing for creation of the large number of images. For example, some systems are based on the use of moving parallax barriers. In these cases, the barrier structures positioned in front of the light emitting pixels limit the visibility of the pixels to very narrow apertures. As the barriers move with a very fast pace, the images are projected to different viewpoints sequentially. In these cases, the light emitting elements are modulated much faster than the barriers move. Some systems use a combination of spatial and temporal multiplexing. The spatial multiplexing may be implemented with a very fast projector system that generates 2D images, which are then reflected from a moving screen to different directions. Rotational movement of the screen may create the different viewpoints at slightly different times, making it possible to project more than two images to one eye if the image projector is fast enough. One problem associated with such systems utilizing temporal multiplexing is in how to produce fast movement of the optical component with actuators that are not too bulky or energy consuming. All the components should also be reliable enough for extended use, which is difficult to achieve with any mechanical movement. Optical systems tend to have very strict tolerances for positioning, and any wear in the movement mechanism may translate to lowered image quality. These problems are especially acute in the case of mobile device displays that are flat, robust and have low power consumption.

One problem with some displays relates to the use of relatively slow LCD displays. A backlight module may produce a set of directional illumination patterns that go through a single LCD, which is used as alight valve that modulates the images going to different directions. LEDs commonly used as light sources may be modulated much faster than the few hundred cycles per second that the current LCDs are capable of. But as all of the directional illumination patterns go through the same display pixels, the display refresh rate becomes the limiting factor in determining how many flicker-free views may be created. The human eye limit for seeing light intensity modulation is generally set to a value of 60 Hz. As an example, it may be calculated that if the LCD display may be modulated with the frequency of 240 Hz, only 4 unique views may be generated with the display without inducing eye straining flicker to the image. In general, the same refresh frequency limitation applies to all 3D display systems that are based on the use of LCDs.

SUMMARY

In some embodiments, contrast-reducing stay light is suppressed to improve the image quality of multiview autostereoscopic 3D displays. The suppression of stray light may be performed with the use of angular filtering made by utilizing band-pass thin film coatings.

In some embodiments, a thin-film stack is coated on top of a lenticular sheet or microlens array, and it selectively blocks or transmits light rays based on their incidence angle on the coated optical interface. As ray incidence angles are larger when alight emitting source is further away from lens optical axis than in the case where the source is closer to it, the angular fitter coating operates to selectively block more stray light than light used for 3D image formation.

In some embodiments, a full multiview 3D display is provided that includes the filter coating over the entire light directing optical component.

Some embodiments for controlling stray light in a multiview display system include alight-emitting element array and a collimating optical layer made up of a regular or non-regular pattern of optical elements coated with an angular filter coating. The optical layer substantially transmits light with an incidence angle to the optical surface structures below a threshold amount (but less than the critical angle), and substantially reflects light that is at an incident angle to the optical surface greater than a threshold angle. The angular filter coating may be on either side or both sides of the optical element. The angular filter coating may be used in conjunction with baffle elements. In some embodiments, different angular filter coatings are used for light paths of different colors, in various patterns/configurations. In some embodiments, the spectrum of the illumination source is selected based at least in part on the properties of the chosen filter coating(s).

Some embodiments of an example display device may include: a light-emitting layer comprising an addressable array of light-emitting elements; an optical layer overlaying the light-emitting layer, the optical layer comprising an array of lenses operative to substantially collimate light from the light-emitting layer; and an angular filter layer along an optical path from the light-emitting layer to an exterior of the display device, the angular filter being operative to substantially block light having an incident angle greater than a threshold angle and to substantially transmit light having an incident angle less than a threshold angle.

In some embodiments of the example display device, the optical layer may be a substantially two-dimensional array of converging lenses.

For some embodiments of the example display device, the optical layer may be a lenticular array.

With some embodiments of the example display device, the angular filter may include a coating on at least one surface of the optical layer.

In some embodiments of the example display device, the optical layer may include a substantially planar surface and a non-planar surface, and the angular filter coating may be on the non-planar surface.

For some embodiments of the example display device, the optical layer may include a substantially planar surface and a non-planar surface, and the angular filter coating may be on the substantially planar surface.

With some embodiments of the example display device, the angular filter may include an interference filter having a plurality of dielectric layers.

In some embodiments of the example display device, each of at least a plurality of the dielectric layers has a thickness approximately equal to one-quarter of a wavelength, in the respective layer, of a predetermined wavelength of light emitted by the light-emitting layer.

For some embodiments of the example display device, at least four of the dielectric layers have a thickness approximately equal to one-quarter of a wavelength, in the respective layer, of the predetermined wavelength of light.

With some embodiments of the example display device, at least one of the dielectric layers has a thickness approximately equal to one-half of a wavelength, in the respective layer, of the predetermined wavelength.

In some embodiments of the example display device, the angular filter layer may include a bandpass interference filter layer.

For some embodiments of the example display device, the bandpass interference filter layer may be along an optical path from the light-emitting layer to an exterior of the display device.

With some embodiments of the example display device, the angular filter layer may include a bandpass interference filter layer, and the bandpass interference filter layer may include a coating on at least one surface of the optical layer.

In some embodiments of the example display device, the optical layer may include a substantially planar surface and a non-planar surface, and the bandpass interference filter coating may be on the non-planar surface.

For some embodiments of the example display device, the optical layer may include a substantially planar surface and a non-planar surface, and the bandpass interference filter coating may be on the substantially planar surface.

With some embodiments of the example display device, the bandpass interference layer may include different interference layer regions with different passbands.

In some embodiments of the example display device, the bandpass interference layer may include: a set of red-tuned interference layer regions with a passband substantially tuned for red light, a set of green-tuned interference layer regions with a passband substantially tuned for green light, and a set of blue-tuned interference layer regions with a passband substantially tuned for blue light.

For some embodiments of the example display device, each light-emitting element may underlie a corresponding interference layer region, the light-emitting elements may underlie red-tuned interference layer regions configured to emit substantially red light, the light-emitting elements may underlie green-tuned interference layer regions configured to emit substantially green light, and the light-emitting elements may underlie blue-tuned interference layer regions configured to emit substantially blue light.

With some embodiments of the example display device, the optical layer may be a substantially two-dimensional array of converging lenses, the angular filter layer may include a bandpass interference filter layer, the bandpass interference filter layer may include different interference layer regions with different passbands, and each interference layer region may correspond to a respective one of the converging lenses.

In some embodiments of the example display device, the angular filter layer may be transparent.

For some embodiments of the example display device, the angular filter layer may be further operative to substantially reflect light toward the light-emitting layer for light having the incident angle greater than the threshold angle.

Some embodiments of a further example display device may include: a light-emitting layer comprising an addressable array of light-emitting elements; an optical layer overlaying the light-emitting layer, the optical layer comprising an array of lenses operative to substantially collimate light from the fight-emitting layer; and a bandpass interference filter layer along an optical path from the light-emitting layer to an exterior of the display device.

With some embodiments of the further example display device, the optical layer may be a substantially two-dimensional array of converging lenses.

In some embodiments of the further example display device, the optical layer may be a lenticular array.

For some embodiments of the further example display device, the bandpass interference filter may include a coating on at least one surface of the optical layer.

With some embodiments of the further example display device, the optical layer may include a substantially planar surface and a non-planar surface, and the bandpass interference filter coating may be on the non-planar surface.

In some embodiments of the further example display device, the optical layer may include a substantially planar surface and a non-planar surface, and the bandpass interference filter coating may be on the substantially planar surface.

For some embodiments of the further example display device, the bandpass interference layer may include different interference layer regions with different passbands.

With some embodiments of the further example display device, the bandpass interference layer may include: a set of red-tuned interference layer regions with a passband substantially tuned for red light, a set of green-tuned interference layer regions with a passband substantially tuned for green light, and a set of blue-tuned interference layer regions with a passband substantially tuned for blue light.

In some embodiments of the further example display device, each light-emitting element may underlie a corresponding interference layer region, the light-emitting elements may underlie the red-tuned interference layer regions configured to emit substantially red light, the light-emitting elements may underlie the green-tuned interference layer regions configured to emit substantially green light, and the light-emitting elements may underlie the blue-tuned interference layer regions configured to emit substantially blue light.

For some embodiments of the further example display device, the optical layer may be a substantially two-dimensional array of converging lenses, and each interference layer region may correspond to a respective one of the converging lenses.

Some embodiments of an example method may include: selectively operating alight-emitting layer may include an addressable array of light-emitting elements to emit light; at an optical layer overlaying the light-emitting layer, using an array of lenses to substantially collimate at least a portion of the light from the light-emitting layer; and operating an angular filter layer along an optical path from the light-emitting layer to an exterior of the display device, the angular filter being operative to substantially block light having an incident angle greater than a threshold angle and to substantially transmit light having an incident angle less than a threshold angle.

Some embodiments of another example method may include: selectively operating alight-emitting layer may include an addressable array of light-emitting elements: at an optical layer overlaying the light-emitting layer, using an array of lenses to substantially collimate light from the light-emitting layer; and transmitting the light through a bandpass interference filter layer along an optical path from the light-emitting layer to an exterior of the display device.

BRIEF DESCRIPTION OF THE DRAWINGS

FIG. 148 is a schematic cross-sectional view illustrating an example optical structure with measurements according to some embodiments.

FIG. 168 is a graph showing an example irradiance distribution of a single source imaged to a viewing window distance according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description.

Example Networks for Implementation of the Embodiments

Figure 1A:
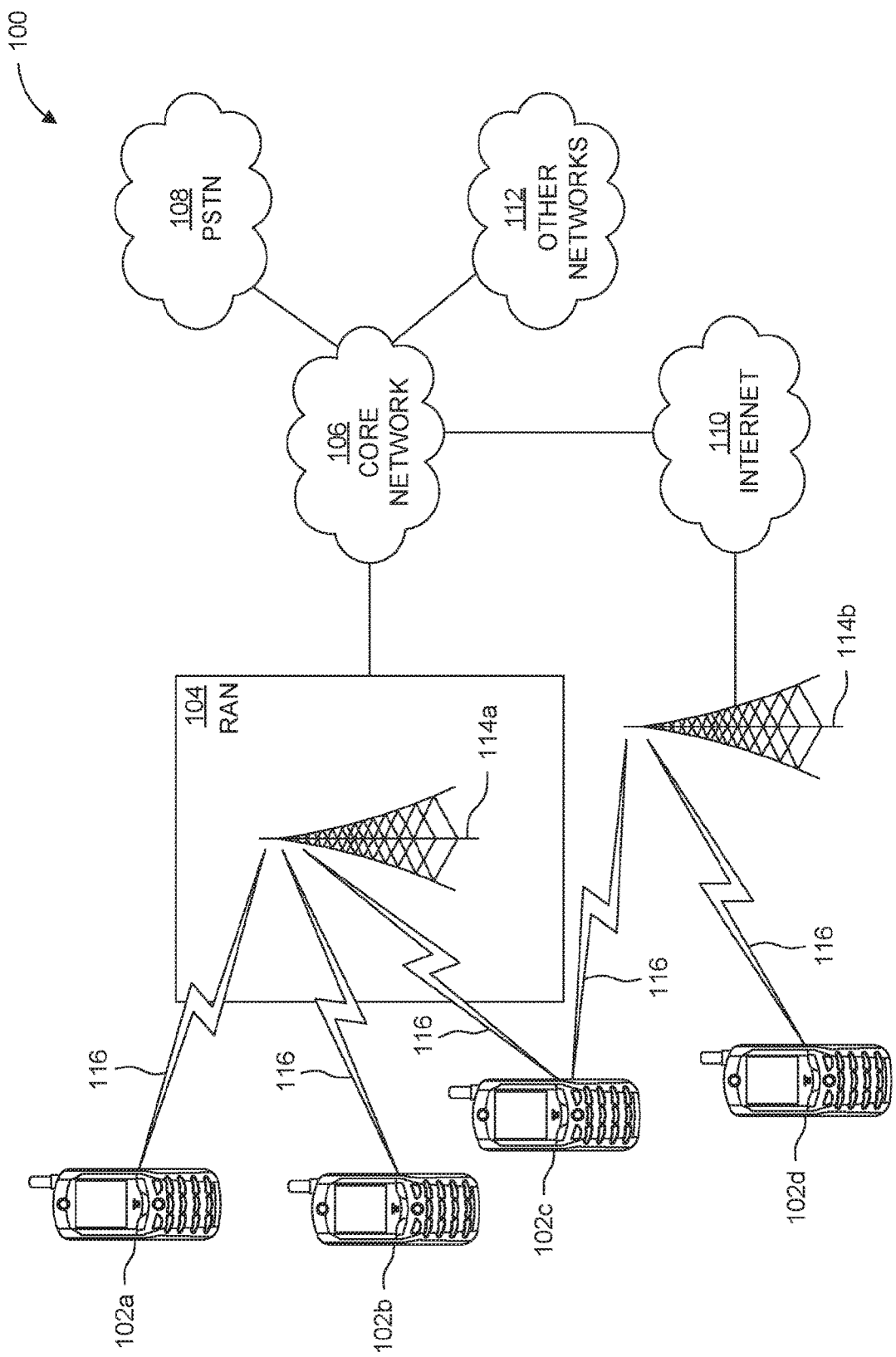
FIG. 1A is a system diagram illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such contort through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a 'station' and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the Ike. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the Ike. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104/113 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106 may be in direct or indirect communication with other RANs that employ the same RAT as the RAN 104/113 or a different RAT. For example, in addition to being connected to the RAN 104/113, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
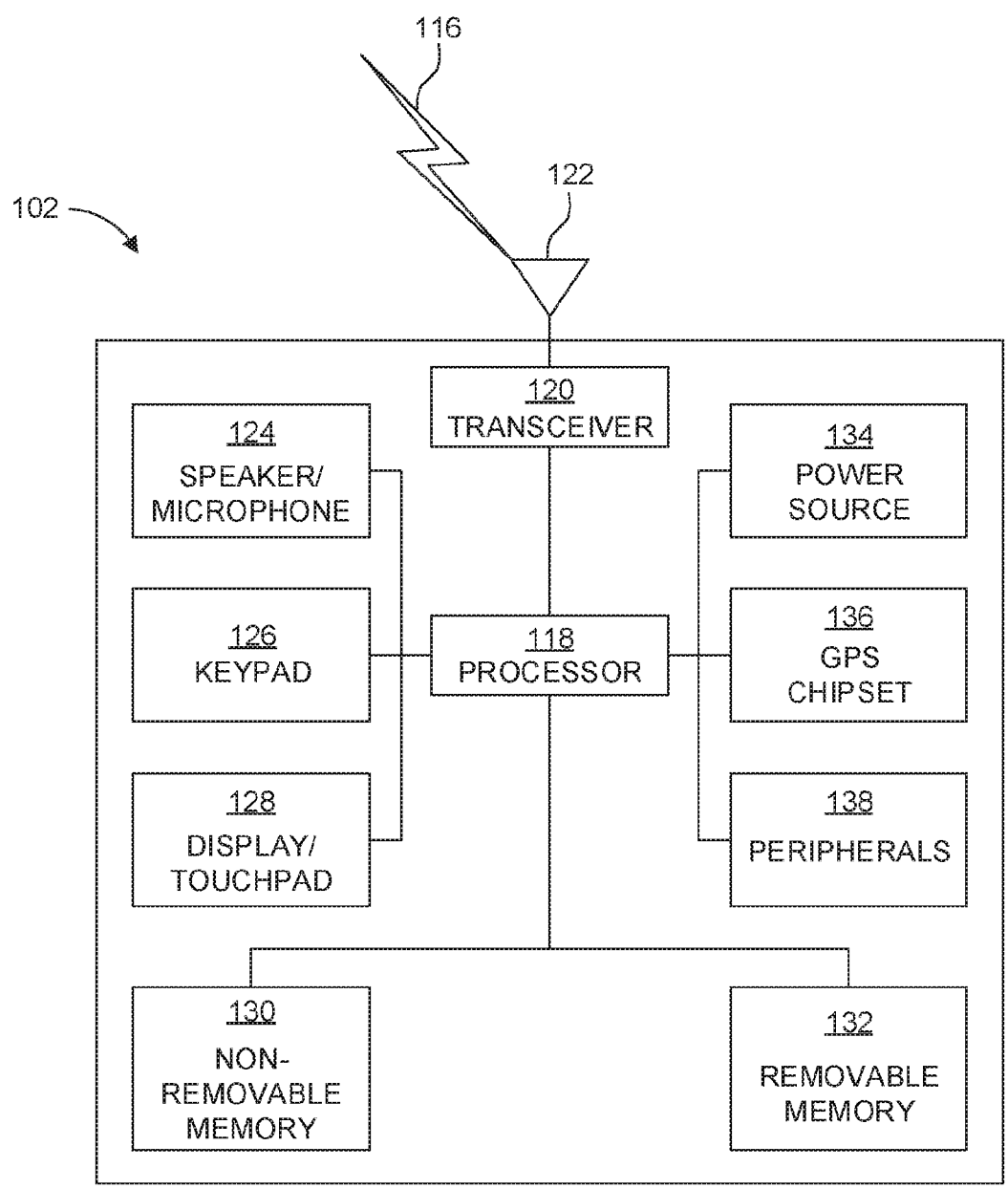
FIG. 1B is a system diagram illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible fight signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NMH), lithium-ion (L-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Issues Addressed in Some Embodiments

Functioning of some currently available, flat-panel-type goggleless multiview displays is based on spatial multiplexing only. In one integral imaging approach, a row or matrix of light emitting pixels is placed behind a lenticular lens sheet or microlens array, and each pixel is projected to a unique view direction in front of the display structure. The more light emitting pixels there are on the light emitting layer, the more views may be generated. In order to obtain a high-quality 3D image, the angular resolution may be in the range of at least 1.0°-1.5° per one view. A high-resolution display, however, may incur issues with stray light: the neighboring views should be adequately separated from each other in order to create a clear stereoscopic image, but at the same time they should be very closely packed in order to offer high angular resolution and a smooth transition from one view to the next one.

Multiview 3D displays based on lenticular sheets or microlenses generally have many different root causes for image-contrast-reducing stray light. All optical systems exhibit some stray light coming from optical surface irregularities (roughness and shape error) as well as light scattering from optomechanical features like apertures and lens mounts. Integral-imaging-based 3D displays may have issues arising from the use of lenticular or microlens structures where the imaging optical shapes are repeated side-by-side over the display area. As one optical shape is changing to the next one, there will be a borderline where the shape is not refracting light rays to the correct directions and some stray light is scattered. Light emitting sources also have typically quite wide emission patterns, which means that the light may spread over more than the aperture of the one lens intended for image projection. The light hitting neighboring lenses causes secondary images that are projected to wrong directions. If a viewer sees simultaneously one of these secondary views with the other eye and one correct view with the other, the perceived image may flip to wrong orientation and the 3D image will be severely distorted.

Figure 2A:
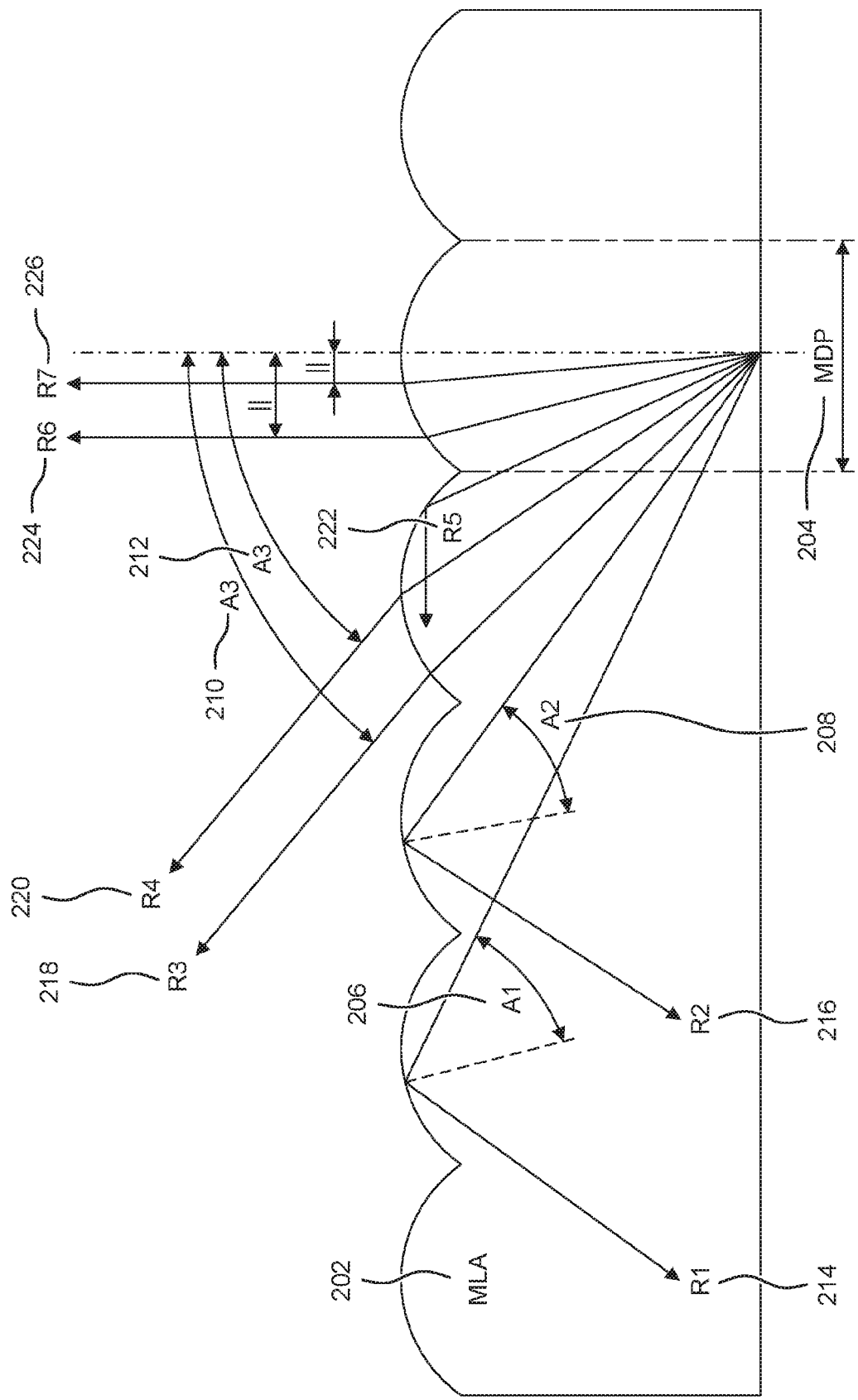
FIG. 2A is a schematic plan view illustrating an example set of rays emitted from a source point at the center line of a multi-directional pixel (MDP) according to some embodiments.

FIG. 2A is a schematic plan view illustrating an example set of rays emitted from a source point at the center line of a multi-directional pixel (MDP) according to some embodiments. As an example, FIG. 2A presents a set of light rays that are emitted from one source point located at the optical axis of one multi-directional pixel (MDP) 204. The MDP 204 may include the combination of an imaging lens shape and the group of sources directly below it. This combination is used repeatedly in a multiview display and it forms one 3D display image pixel that has multiple unique image directions. The microlens array (MLA) 202 may be arranged in such a way that the focal length of a single lens shape is the same as the optical distance between the source and lens. This means that the rays originating from a single source point and hitting the lens-air interface are bent to substantially identical angular directions making the projected rays parallel. As an example, FIG. 2A shows rays R3 (218) and R4 (220) that are parallel to each other.

Rays R6 (224) and R7 (226) shown in FIG. 2A represent the intended projected image direction. The single image point located on the optical axis emits these two rays which are projected to the same direction as the optical axis. All the other pictured rays emitted from the same point hit the neighboring lens surfaces. Rays R1 (214) and R2 (216) experience total internal reflection (TIR) at the MLA 202 material-air interface as the incidence angles A1 (206) and A2 (208) are too large for transmittance. Rays R3 (218) and R4 (220) have smaller incidence angles at the interface and they are transmitted to the other side of the interface and bent to an angle A3 (210, 212). As the rays are imaged through the wrong lens, the projected view is now the secondary image of the source. In a real-life 3D display, the image that was intended to be shown in the optical axis direction would also simultaneously show up in the direction A3 (210, 212). Ray R5 (222) hits the lens material-air interface again with an angle that is over the TIR limit and is reflected back. In this case the lens material-air interface acts like a natural angular filter that blocks the propagation of rays that have too steep incidence angles.

Figure 2B:
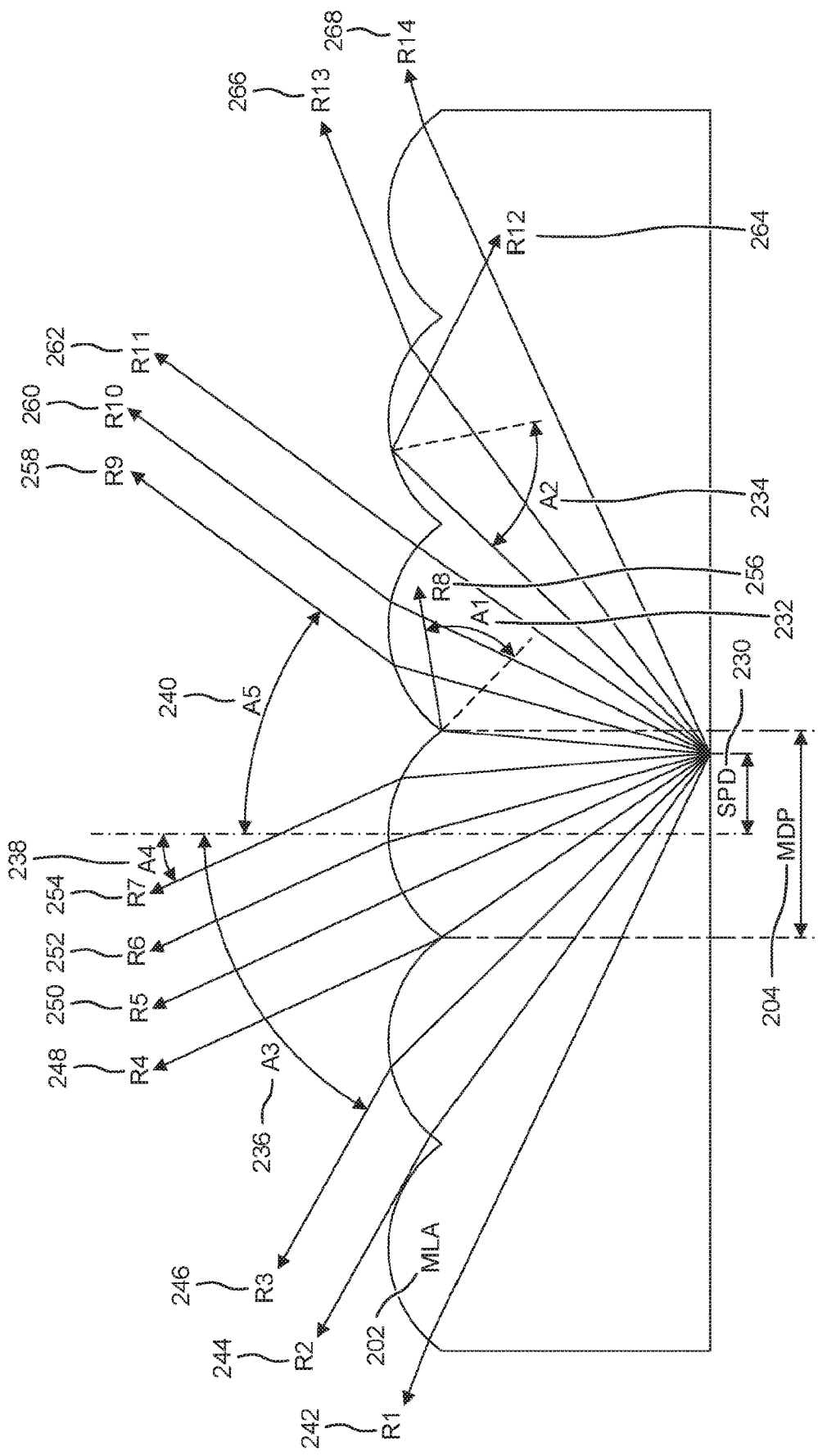
FIG. 2B is a schematic plan view illustrating an example set of rays emitted from a source point off from the center line of an MDP according to some embodiments.

FIG. 2B is a schematic plan view illustrating an example set of rays emitted from a source point off from the center line of an MDP according to some embodiments. FIG. 2B shows another example set of rays that is generated with the same optical design, but now the source point is located at a distance (SPD) 230 from the optical axis. In this case, rays R4 (248), R5 (250), R6 (252), and R7 (254) are transmitted through the lens material-air interface and bent to direction A4 (238), which is now the intended view direction. As the source is not located on the optical axis, also the projected view direction is off-axis. In addition to the intended view, there are now two additional secondary view directions A3 (236) and A5 (240) on both sides of the intended direction. In a real life multiview display, all of these three view directions would now have the same image content. As the source point is now located close to the right border of the MDP 204, a large portion of the light emitted hits the next lens surface on the right. Rays R9 (258), R10 (260), and R11 (263) are projected to an angle A5 (240) that is close to the intended view angle A4 (238), but to an opposite side of the optical axis. On the left side of the intended MDP 204, the rays R3 (246) and R2 (244) are bent to an angle A3 (236), which is further away from the intended view direction. From these two secondary image directions, the rays propagating to direction A5 (240) have a more severe stray light effect on the 3D image quality than the rays projected to angle A3 (236) due to the fact that they are close to the intended display field-of-view (FOV). Another ray on the left side of the intended MDP 204, the ray R1 (242) is also bent away from the intended view direction. Rays on the right side of the intended MDP 204, R13 (266) and R14 (268) are bent away from the intended view direction. Rays R8 (256) and R12 (264) experience total internal reflection (TIR) at the MLA 202 material-air interface as the incidence angles A1 (232) and A2 (234) are too large for transmittance.

Figure 3:
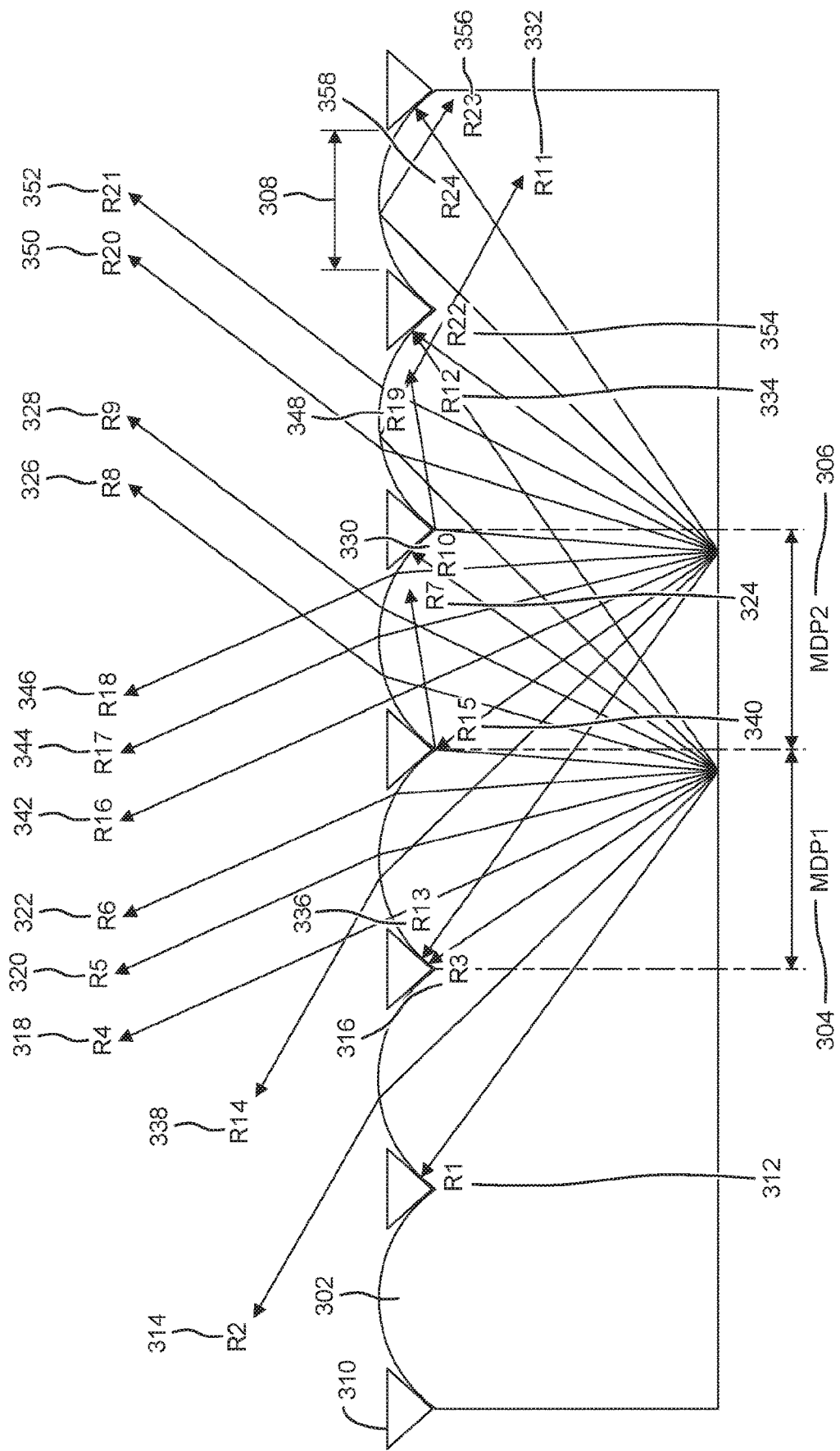
FIG. 3 is a schematic plan view illustrating example sets of rays emitted from two neighboring MDPs with baffle structures according to some embodiments.

FIG. 3 is a schematic plan view illustrating example sets of rays emitted from two neighboring MDPs with baffle structures according to some embodiments. FIG. 3 presents the same example optical design as in FIGS. 2A-2B, but now with ray sets R4 (318), R5 (320), R6 (322) and R16 (342), R17 (344), R18 (346) from two neighboring MDPs, MDP1 (304) and MDP2 (306). In this case, a set of light-absorbing baffles 310 has also been added between the lenses in order to reduce the amount of stray light A series of optical apertures 308 is now formed, which limit the locations of rays that may be projected out of the system. For example, rays R1 (312), R3 (316), R10 (330), R12 (334), R13 (336), R15 (340), R22 (354), and R24 (358) would be projected out of the display as stray light, but now the baffles block their propagation. This may somewhat improve the image quality as some stray light is suppressed. However, there is still stray light exiting the structure through the neighboring lens apertures. Rays R2 (314), R8 (326), R9 (328), R14 (338), R20 (350), and R21 (352) are some examples of these stray light rays that cannot be blocked with the mechanical baffle structures 310 as they travel through optical apertures 308 that are used for the image formation on the neighboring MDPs 304, 306. Blocking of these stray ray paths could be performed with a system that has adjustable apertures that block of pass the rays at different time intervals. In this case, the system may require an additional spatial light modulator (SLM), like e.g., an LCD panel and temporal multiplexing with synchronization between the light emitters and SLM. Rays R7 (324), R11 (332), R19 (348), and R23 (356) experience total internal reflection (TIR) at the MLA 302 material-air interface because the incidence angles are too large for transmittance.

Figure 4:
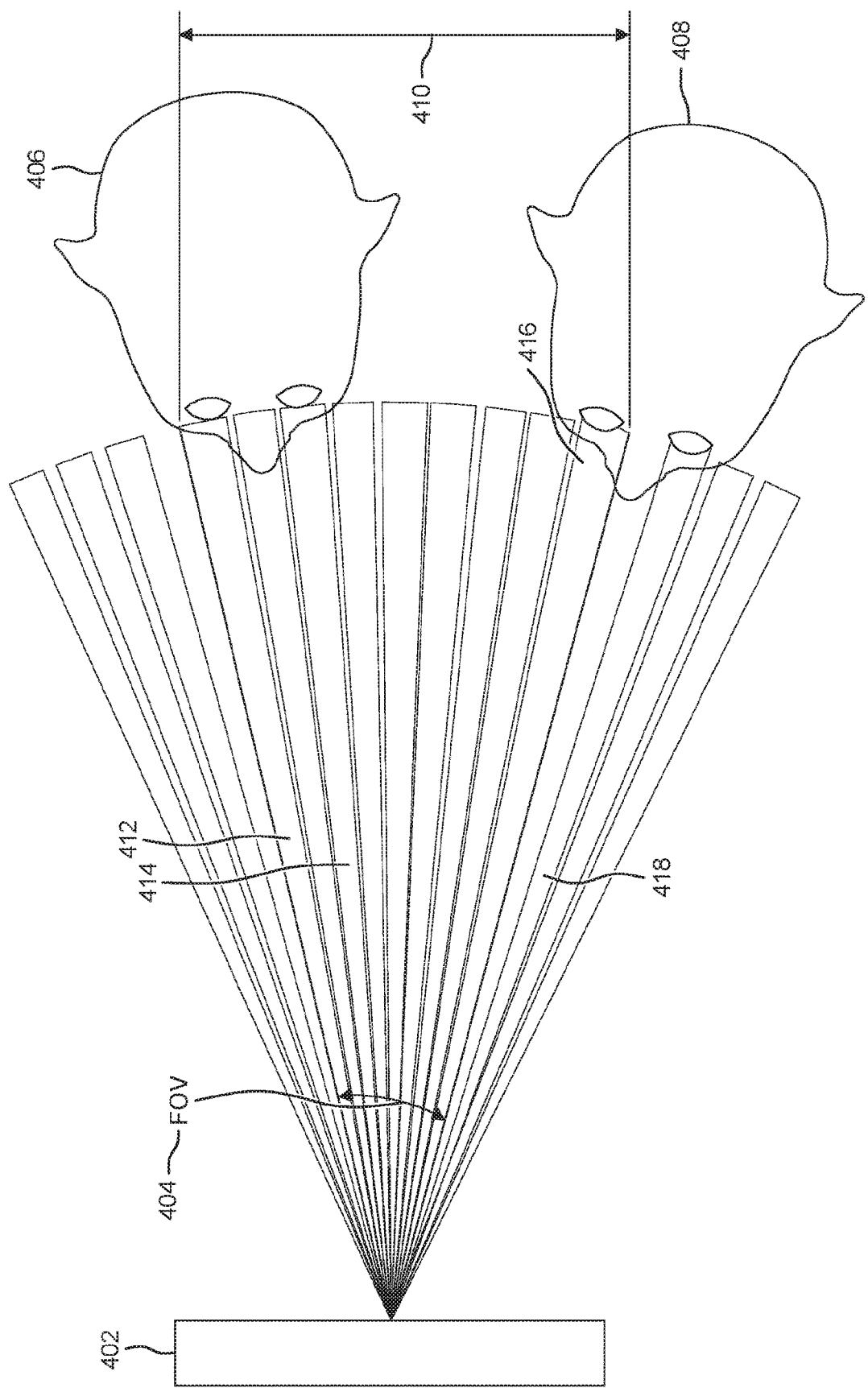
FIG. 4 is a schematic plan view illustrating an example viewing geometry of an example 9-view autostereoscopic 3D display according to some embodiments.

FIG. 4 is a schematic plan view illustrating an example viewing geometry of an example 9-view autostereoscopic 3D display according to some embodiments. FIG. 4 shows an example viewing geometry of a 9-view 3D display. The separate views are projected by the 3D multiview display 402 to a specific FOV 404, and the cone of projection directions forms a viewing window 410 at certain viewing distance. It is desirable to project to the viewing window individual source images that are smaller than the distance between viewer eyes (average ~64 mm). For example, a viewer at position 1 (406) would see with the right eye the primary view projected to direction 1 (412) and with the left eye the primary view projected to direction 3 (414). As the image content in these two directions is rendered from two different viewpoints, the viewer is able to form a stereoscopic 3D image. However, there are also secondary view directions, which are the stray light images projected through neighbouring lenses in the array. These views may start right from the edge of the intended FOV 404, and they have wrong image content in respect to the view direction. This means that if the viewer is at position 2 (408) in the displayed viewing geometry, the right eye would still see the correct image projection to direction 9 (416), but the left eye would see the secondary projection of the image that was intended for view direction 1 (418). In such a case the image would be flipped, and the perceived 3D content would be severely distorted.

Figure 5:
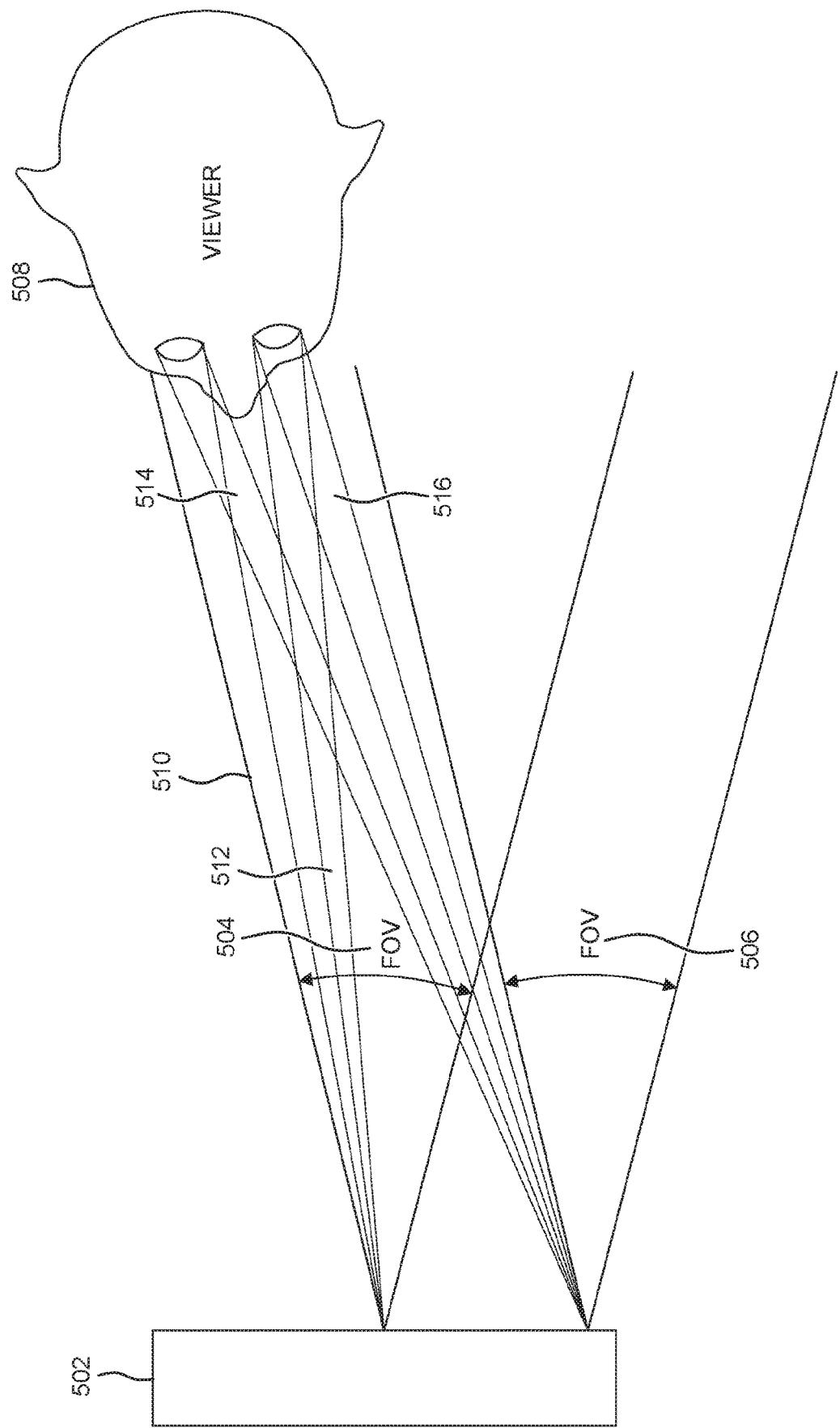
FIG. 5 is a schematic plan view illustrating an example viewing geometry problem occurring with flat multiview displays according to some embodiments.

FIG. 5 is a schematic plan view illustrating an example viewing geometry problem occurring with flat multiview displays according to some embodiments. It is desirable for the same view directions from different parts of the display 502 to be projected to the same positions at the viewing window, as pixel FOVs should overlap at the eyes of the viewer 508. If the FOVs do not overlap, some parts of the 3D image cannot be formed, or the two eyes will get wrong images and 3D image may not be visible. If there is a mismatch between FOVs it is also possible that the viewer sees secondary stray light view directions from some part of the display making the image somehow distorted. This situation is pictured in FIG. 5, where the example flat 9-view 3D display 502 is projecting views only to surface normal directions. A central display pixel is projecting correct primary views 1 (510) and 3 (512) to the two eyes of the viewer, and a proper stereoscopic 3D image at the center of the display is formed. However, as the FOVs 504, 506 do not completely overlap, display edge pixels are projecting views outside the viewer eyes and only secondary views (e.g., secondary directions 7 (514) and 9 (516)) from the other side of intended 3D image are visible. This means that the edge of the display shows a wrong image pair and total image is badly distorted.

Figure 6:
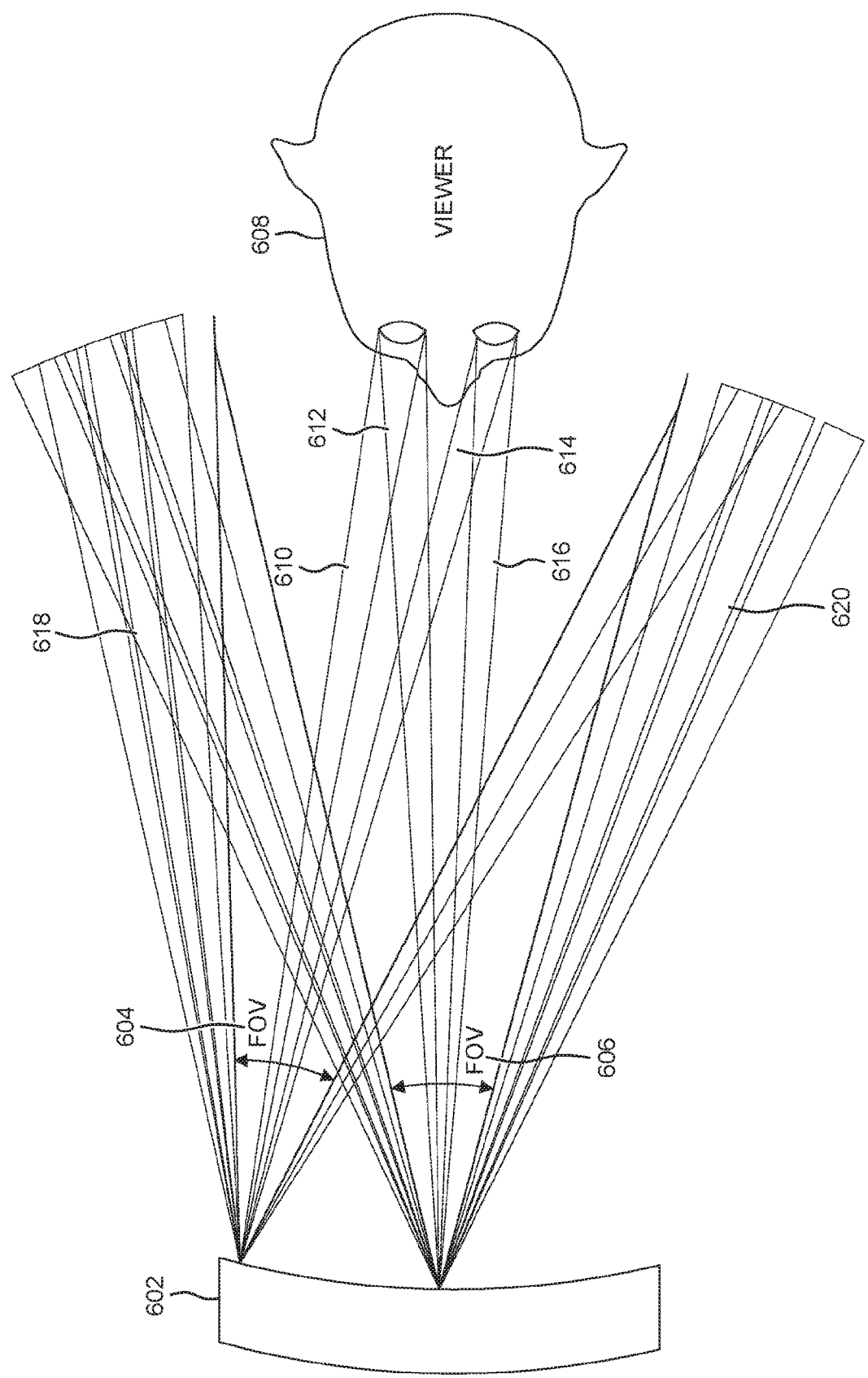
FIG. 6 is a schematic plan view illustrating an example curved display used to address a multiview display viewing geometry problem according to some embodiments.

FIG. 6 is a schematic plan view illustrating an example curved display used to address a multiview display viewing geometry problem according to some embodiments. In order to make directional pixel FOVs 604, 606 overlap at a specified viewing distance, the display 602 may be, e.g., curved with a certain radius, or the projected beam directions may be turned towards a specific point with, e.g., a flat Fresnel lens sheet. It is also possible to use a flat display without extra focusing optics and to shift the positions of the pixels towards the display edges. However, in this case the amount of stray light projected to secondary view directions is increased at the same time as the amount of light projected to intended view directions is decreased. FIG. 6 shows an example where individual display directional pixel FOVs 604, 606 are made to overlap by curving the display surface 602. If the curvature of the display is correct, al the view directions (e.g., including primary directions 4 (610, 612) and 6 (614, 616)) projected from different parts of the display will overlap exactly at the position of the viewer 608, and a coherent 3D image is visible. In this case the secondary stray light views 618, 620 will be projected outside the viewing window.

Figure 7B:
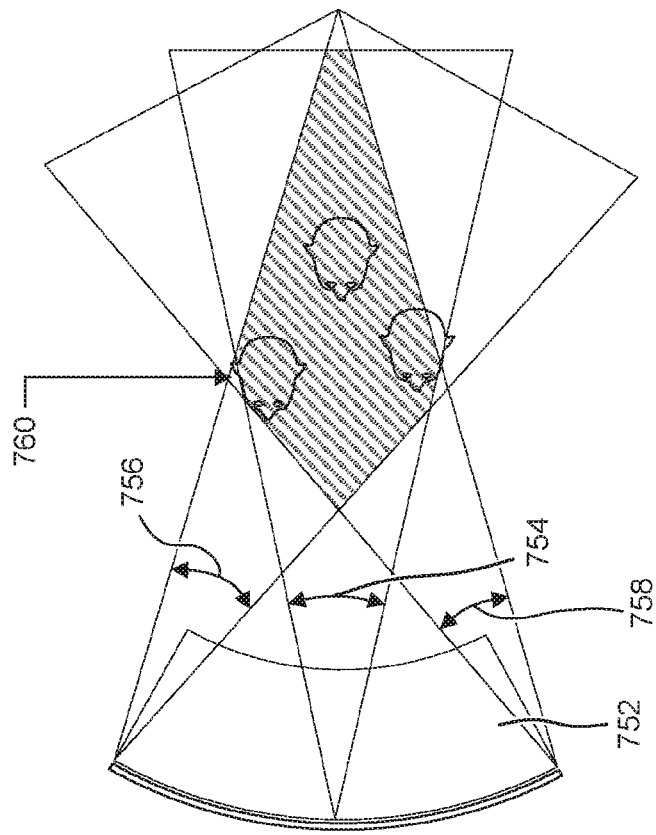
FIG. 7B is a schematic plan view illustrating an example 3D display viewing geometry for multiple viewers according to some embodiments.
Figure 7A:
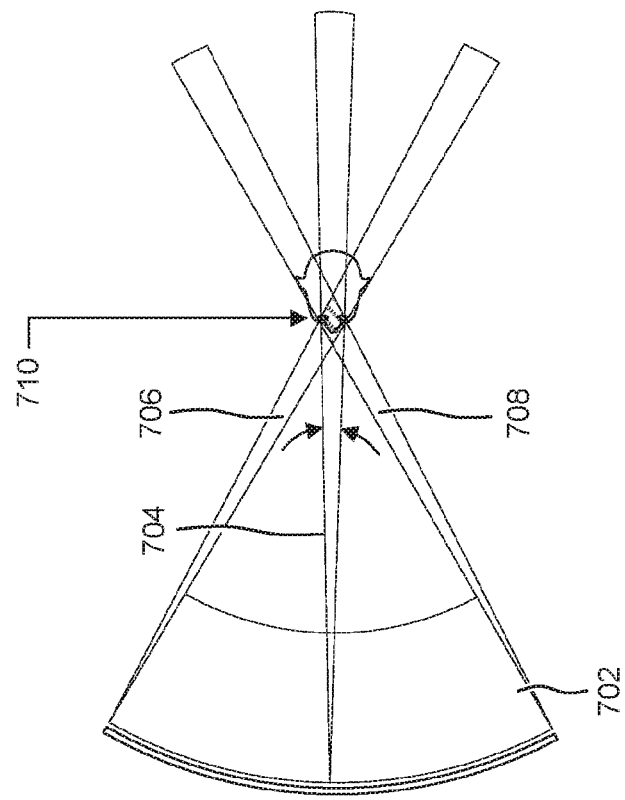
FIG. 7A is a schematic plan view illustrating an example 3D display viewing geometry for a single viewer according to some embodiments.

FIG. 7A is a schematic plan view illustrating an example 3D display viewing geometry for a single viewer according to some embodiments. FIG. 7B is a schematic pan view illustrating an example 3D display viewing geometry for multiple viewers according to some embodiments. Overlapping beam bundle FOVs form not only a flat viewing window, but a viewing zone with depth around the facial area of the viewer. The size of this viewing zone determines the amount of movement allowed for the viewer head. Both eye pupils should be inside the zone simultaneously in order to make the stereoscopic image possible. FIGS. 7A and 7B show schematic presentations of two different example viewing geometries for image zones 702, 752. In the first pictured case, FIG. 7A, a single viewer is sitting in front of the display and both eye pupils are covered with a small viewing zone 710 achieved with narrow beam bundle FOVs 704, 706, 708. The minimum functional width of the zone is determined by the eye pupil distance (on average ~64 mm). A small width also means a small tolerance for viewing distance changes as the narrow FOVs 704, 706, 708 start to separate from each other very fast both in front of and behind the optimal viewing location. The second case, FIG. 7B, presents a viewing geometry where the beam bundle FOVs 754, 756, 758 are quite wide making it possible to have multiple viewers inside the viewing zone 760 and at different viewing distances. In this case also the positional tolerances are large.

The size of the viewing zone may be designed on the basis of the use case by altering beam bundle FOVs. This may be done by either increasing the width of the light emitter row or by changing the focal length of the beam collimating optics. Unfortunately, smaller focal lengths mean larger projected voxels, and it may be desirable to increase the focal length for better spatial resolution. This means that there is a trade-off situation between optical design parameters like spatial/angular resolution, lens focal length and FOV, and the design may be balanced for each use case separately.

Shorter lens focal lengths may be used for increasing the FOV, but it also means that the emitters are closer to lens apertures and larger amounts of light hit neighboring lenses in the array causing stray light With very short focal lengths and large aperture sizes, the secondary views may become very bright especially at the edges of the display where the views will need to be tilted towards the center of the viewing zone. Bright secondary may limit the size of the viewing zone and force FOV reduction, by e.g. leaving some pixels unused at the borders between individual lenses. This way, the stray light properties of the display optical structure have an effect to the performance specifications and use comfort of a multiview 3D display.

Angle-Tuned Thin-Film Optical Filters

Thin-film filters are one type of optical component that may be used for selective transmission of light wavelengths. These filers include a stack of thin film coatings that have variable refractive indices and accurately controlled thicknesses in the same size range as a wavelength of light (e.g. around % wavelength and above). With certain combinations of light incidence angle, polarization and wavelength, the coating stack either transmits or blocks/reflects the incident light due to constructive/destructive interference of light waves.

One group of thin-film filters has been developed for tuning the position of the spectral transmission window by rotating a flat optical component that has specially designed thin-film coating stack. Such filters are described in US20110170164A1. These components are based on the phenomena where the transmission spectrum of a thin-film stack shifts towards shorter wavelengths when the angle of incidence is increased from surface normal direction to larger angles. Desirable properties for such filters include e.g., steep edges in the transmission curves, non-sensitivity to light polarization, and wide range of usable angles. Some available components have all of these properties and they may be custom designed for different central wavelengths and transmission window sizes. Angle-tuned filters are generally used in applications like fluorescence microscopy, spectral imaging, and telecommunications.

Angle-tuned thin-film filters typically have a designed central transmission wavelength defined at 0° light incidence angle and a transmission window, the width of which is defined in nanometers. Edges of the transmission window are designed to be steep in order to have a clear relation between component rotation angle and transmission wavelength. One example set of angle-tuned filter optical parameters is presented in the real-world case discussed in greater detail below. Some optical properties of this filter are presented with a set of graphs in FIGS. 15A-15D. In the example filter, the central wavelength was set to green 550 nm and the transmission window width at the maximum 95% to 25 nm. Transmission window width at 0% transmission minimum was set to 30 nm making the spectral window edges fairly steep.

One optical property of angle-tuned thin-film filters is the spectral transmission window shift that may be induced by rotating a component coated with the thin-film stack. Components used are usually flat glass windows that are attached to rotating mechanical mounts. As the filter is turned with respect to the direction of incoming beam of collimated light, the spectral window position is shifted, and output beam color is changed. Alternatively, the filter may be used for blocking the transmission altogether if the beam spectral width is narrow like in the case of e.g. a laser. In order to make the wavelength tuning property to cover as wide span as possible, the filters are designed to have large angular working range. The example filter presented in FIGS. 15A-15D has spectral window shift of 60 nm when the tilt angle is 60°.

Overview of Example Embodiments

This disclosure presents systems and methods for suppressing stray fight in integral imaging 3D multiview systems by utilizing angular filtering. A thin-film stack is coated on top of a lenticular sheet or microlens array. The properties of the thin-film stack are chosen such that it selectively blocks or transmits light rays based on their incidence angle on the coated optical interface. As ray incidence angles are larger when alight emitting source is farther away from lens optical axis than in the case where the source is closer to it, the angular filter coating operates to selectively block more stray light than light used for 3D image formation. In some embodiments, the angular filter coating is a substantially continuous coating layer.

Systems and methods described herein may reduce the stray light encountered in multiview 3D displays based on integral imaging. The presented optical coating makes it easy to apply to currently used 3D display optical structures based on lenticular sheets and microlenses.

The thin film structure used in some embodiments is flat and does not add much thickness to existing display optics, which is beneficial when there is a desire for a compact display structure.

Example systems and methods may be especially useful in the creation of a very dense multiview picture that fulfills the SMV condition enabling high quality 3D image experience. In SMV systems, the image view directions are closely packed, and mechanical means cannot be used effectively for secondary view direction blocking. Example systems and methods described herein make it possible to add stray light suppression structures directly to the optical paths, which may be more effective than mechanical baffles. Baffles also add light-absorbing apertures to the system, which lower image brightness, and baffles call for accurate mechanical alignment, which is not needed with example angular filter coating embodiments.

As the angular filters are able to suppress the secondary stray light peaks, they may create a clear gap between the intended FOV and the zones where the secondary views are visible. This means that it is possible to create a design where the image will be totally faded out when the viewer moves just outside the intended FOV. This makes the borderline clear for the viewer and improves display use comfort considerably as the FOV may be kept larger and there is no confusion on where the intended view zone starts.

In some embodiments, the angular filters may be used in evening out the brightness differences between central and side views. Uneven brightness between the views could otherwise lead to a need for source components to be driven over different dynamic ranges, and this calls for calibration. If better uniformity across angular range is achieved with the use of angular filters, there is less need for source component drive calibration, and source components may be designed for more uniform dynamic range.

Example Angular Filters

This disclosure presents embodiments for suppressing stray light in integral imaging 3D multiview systems by utilizing angular filtering. A thin-film stack is coated on top of a lenticular sheet or microlens array. The properties of the thin-film stack are selected so as to selectively block or transmit fight rays based on their incidence angle on the coated optical interface. As ray incidence angles are larger when alight emitting source is farther away from lens optical axis than in the case where the source is closer to it, the angular filter coating is able to selectively block more stray light than light used for 3D image formation.

Figure 8A:
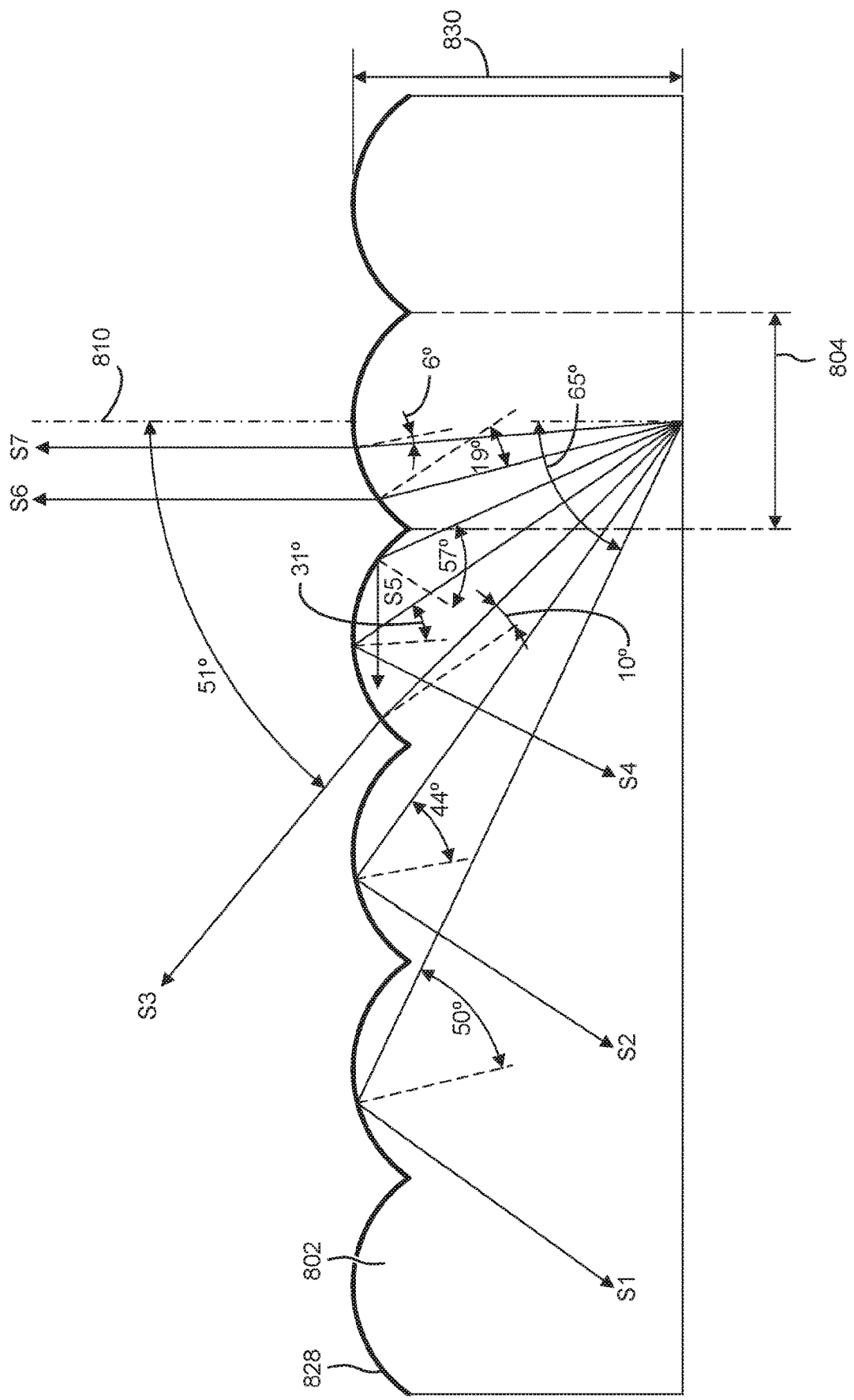
FIG. 8A is a schematic cross-sectional view illustrating an example optical structure with measurements (μm) where a group of rays is emitted from a source point located on the MDP optical axis according to some embodiments.
Figure 8B:
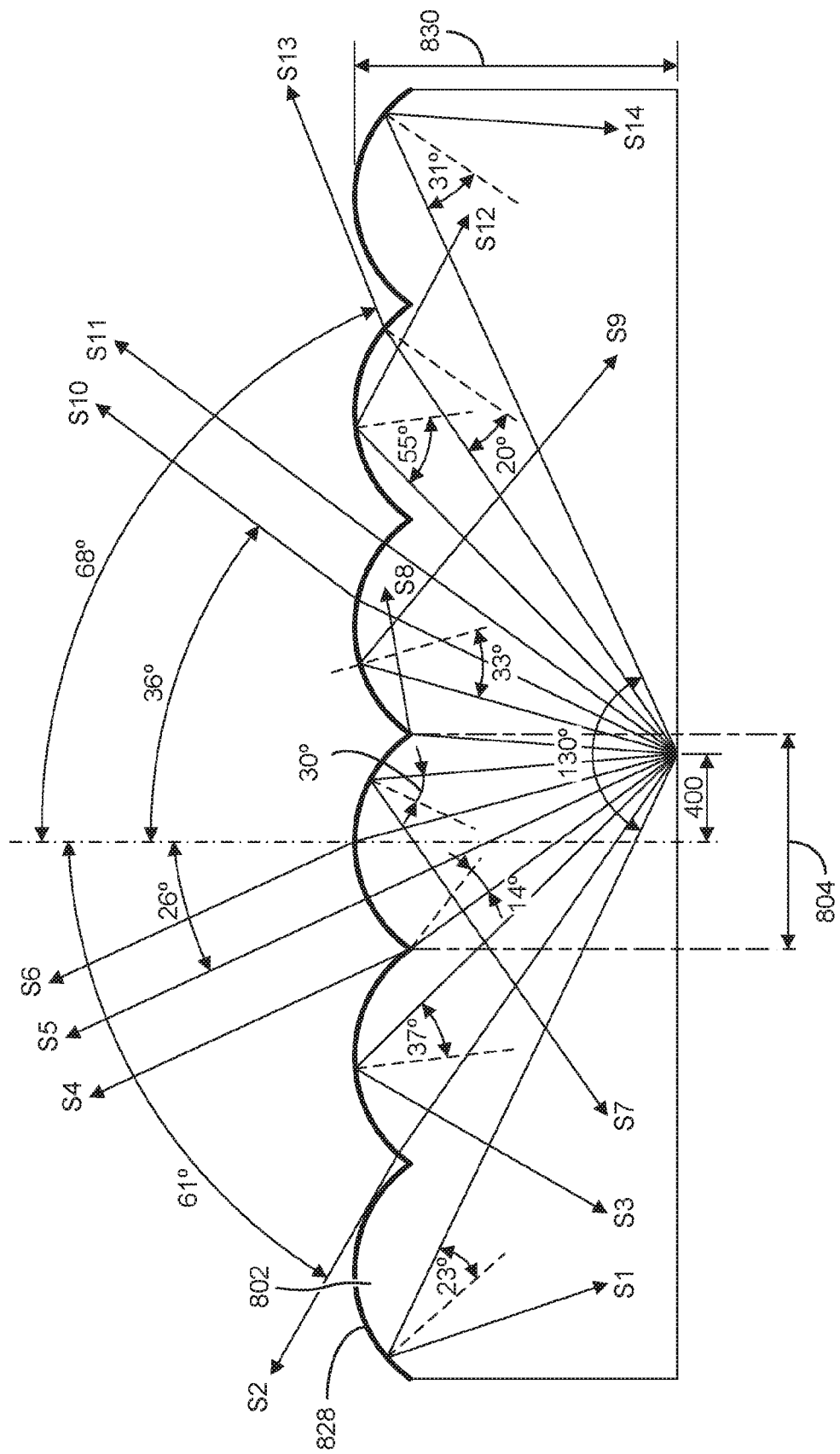
FIG. 8B is a schematic cross-sectional view illustrating an example optical structure with measurements (μm) where a group of rays is emitted from a source point located off the MDP optical axis according to some embodiments.

FIGS. 8A-8B show schematics of one example structure were a microlens array (MLA) is coated with a thin film stack that acts as an angular fitter. The MLA may be a polymer sheet manufactured from polystyrene or other material. A group of sources placed at the bottom of the sheet are imaged by the microlenses to a set of collimated beams that propagate to different angular directions based on their position under each lens. A single lens in the array together with the source matrix under it form a multidirectional display pixel (MDP). The width of a single example MDP unit in this embodiment is 1 mm.

In some embodiments, an angular filter is formed directly on top of the lens surfaces by coating the lenticular or microlens sheet with accurately controlled thin-film layers that have materials with different refractive indexes. Example coating materials are $Nb_2O_5$ and $SiO_2$ that may be applied as alternating layers with variable thicknesses in the range of e.g. 70 nm-140 nm. Total thickness of the coating stack may be e.g. ~15 μm. The coating is designed to have a steeply edged spectral transmission window centered at 0° incidence angle to the light source spectral emission peak. This window is shifted towards smaller wavelengths when the incidence angle of the light ray to the optical interface is tilted from lens surface normal direction. In the example case presented in FIGS. 8A-8B, the angular filter coating on the lens surfaces is designed to transmit substantially all rays that hit the interface at an angle below 20° and to reflect substantially all other rays back towards the light emitting layer where they are absorbed either to the backplane substrate or to the light emitting components.

FIG. 8A is a schematic cross-sectional view illustrating an example optical structure with measurements (μm) where a group of rays is emitted from a source point located on the MDP optical axis according to some embodiments. FIG. 8A presents an example of an MLA 802 where a source point lies at the optical axis of the MDP with an example width 804 of 1000 μm. The MLA 802 is shown with an example height 830 of 1500 μm. Emitted light rays S6 and S7 meet the filter interface at angles 19° and 6°, respectively and are transmitted. Lens surface curvature and refractive index difference between the MLA material 802 and air makes both rays bend toward a direction parallel to the optical axis 810. These rays represent an image beam that is used in forming the image at multiview display central 0° viewing direction. Ray S1 is emitted at an angle of 65°. Ray S3 is emitted from the same point hits neighboring lens surface with an incidence angle of 10° and is also transmitted. This ray bends at the interface to an angle of 51° and it forms a secondary stray light image projection that propagates outside the display intended FOV. Ray S4 would be imaged to the same direction as S3, but as it hits the angular filter coating 828 with an angle of 31°, the filter reflects the ray instead of transmitting it. All other rays (S1, S2, and S5) presented in FIG. 8A also meet the filter surfaces with incidence angles (50°, 44°, and 57°, respectively) higher than the 20° cut-off angle, and they are substantially reflected within the optical structure. The coating 828 is thus able to suppress some of the stray light that would have otherwise lowered the multiview image quality.

FIG. 8B is a schematic cross-sectional view illustrating an example optical structure with measurements (μm) where a group of rays is emitted from a source point located off the MDP optical axis according to some embodiments. FIG. 8B presents another example case with the same optical design as in FIG. 8A, but now the source point is located 0.4 mm off from the optical axis. The MDP is shown with an example width 804 of 1000 μm. The MLA 802 is shown with an example height 830 of 1500 μm. The example source point is shown emitting rays over a range of 130°. Rays S4, S5, and S6 hit the angular filter coating 828 at the designated lens surface with incidence angles of 14°, 1°, and 15°, respectively. (For the sake of clarity, not all angles are illustrated expressly.) As all these angles are below the 20° cut-off angle, the rays S4, S5, and S6 are transmitted and refracted to an angle of 26° from the MDP optical axis. These rays S4, S5, and S6 represent the image beam that is used in forming the image at multiview display 26° viewing direction. Rays S2, S10, S11, and S13 hit the surface of the neighboring lens with incidence angles 10°, 17°, 1°, and 20°, respectively. These rays S2, S10, S11, and S13 are transmitted and refracted to angles of 61°, 36°, 36°, 68°, respectively, from the display surface normal and represent stray light secondary image beams travelling outside the intended display FOV. Ray S9 would also refract to this direction, but because the incidence angle at the coated surface is 33°, ray S9 is substantially blocked by the angular filter 828 and some of the stray light is suppressed. Similarly, rays S1, S3, S7, S8, S12, and S14 have incidence angles of 23°, 37°, 30°, 53°, 55°, 31°, respectively, and are blocked by the angular filter 828. If the angular filter cut-off angle is selected to be 16° instead of 20°, stray light ray S10 also would be substantially attenuated without affecting the image rays S4, S5, and S6. This example shows how optical design and filter design parameters may be fitted together in order to obtain a desired result.

It may be seen from FIG. 8B that ray S7 would be imaged to the same direction as image beam rays S4, S5, and S6, but as the incidence angle is 30°, ray S7 is blocked by the angular filter 828. This example shows that also some of the intended light may be attenuated by the angular filter 828. Therefore, it is desirable for the filter to be configured in such a way that the angular cut-off is positioned to an angle where more stray light is blocked than light intended for image formation. This way the multiview display signal-to-noise ratio may be improved. As the filter 828 may be applied directly on the optical apertures without too much disturbance to the intended functioning of the integral imaging optical system, it may be more effective in suppressing stray light than mechanical baffles that are positioned outside optical paths.

For some embodiments, a display device, such as the example shown in FIG. 8B, may comprise alight-emitting layer comprising an addressable array of light-emitting elements; an optical layer overlaying the light-emitting layer, the optical layer including an array of lenses operative to substantially collimate light from the light-emitting layer; and an angular filter layer along an optical path from the light-emitting layer to an exterior of the display device, the angular filter being operative to substantially block light having an incident angle greater than a threshold angle and to substantially transmit fight having an incident angle less than a threshold angle. In some embodiments, the angular filter layer is transparent. The angular filter layer may be operative to substantially reflect light toward the light-emitting layer for light having the incident angle greater than a threshold angle, such as 20°, for example. An example display device may include: a light-emitting layer comprising an addressable array of light-emitting elements; an optical layer overlaying the light-emitting layer, the optical layer comprising an array of lenses operative to substantially collimate light from the light-emitting layer; and a bandpass interference filter layer along an optical path from the fight-emitting layer to an exterior of the display device. A display device may execute a method that includes: selectively operating alight-emitting layer comprising an addressable array of light-emitting elements to emit light at an optical layer overlaying the light-emitting layer, using an array of lenses to substantially collimate at least a portion of the light from the light-emitting layer; and operating an angular filter layer along an optical path from the light-emitting layer to an exterior of the display device, the angular filter being operative to substantially block light having an incident angle greater than a threshold angle and to substantially transmit light having an incident angle less than a threshold angle. Another example display device may execute a method that includes: selectively operating a light-emitting layer comprising an addressable array of light-emitting elements; at an optical layer overlaying the light-emitting layer, using an array of lenses to substantially collimate light from the light-emitting layer; and transmitting the light through a bandpass interference filter layer along an optical path from the light-emitting layer to an exterior of the display device.

Functioning of the thin film angular filters is based on the phenomena where the filter spectral transmission window is shifted with light incidence angle. As a result, there is a relation between light transmission wavelength and angle of incidence. If wide spectral range light sources are used, the angular filtering method separates colors by angle. To address this, in some embodiments, only relatively narrow spectral band sources may be used with the method.

One example of a light source fitting to the presented filtering technique is the µLED, which has typical spectral widths around 20-30 nm. Components with three different colors, red, green, and blue, may be used for a full-color display. Single color µLEDs (UV/blue) with overcoated quantum-dot fluorescent materials for conversion of the three colors are also one viable option. LCD displays with white backlight and relatively wide transmission window color filters may also be used, but such displays have spectral widths of several tens of nanometers, so angle-filtering may not be as effective as with µLEDs. Alternative light sources for some embodiments are a laser diode or a VCSEL (vertical-cavity surface-emitting laser), which have spectral widths below 1 nm. With such sources, the cut-off angles may be very sharp, and if there is any angle-dependent coloration, the human eye is not capable of detecting the spectral difference due to its limited color resolution.

Figure 9:
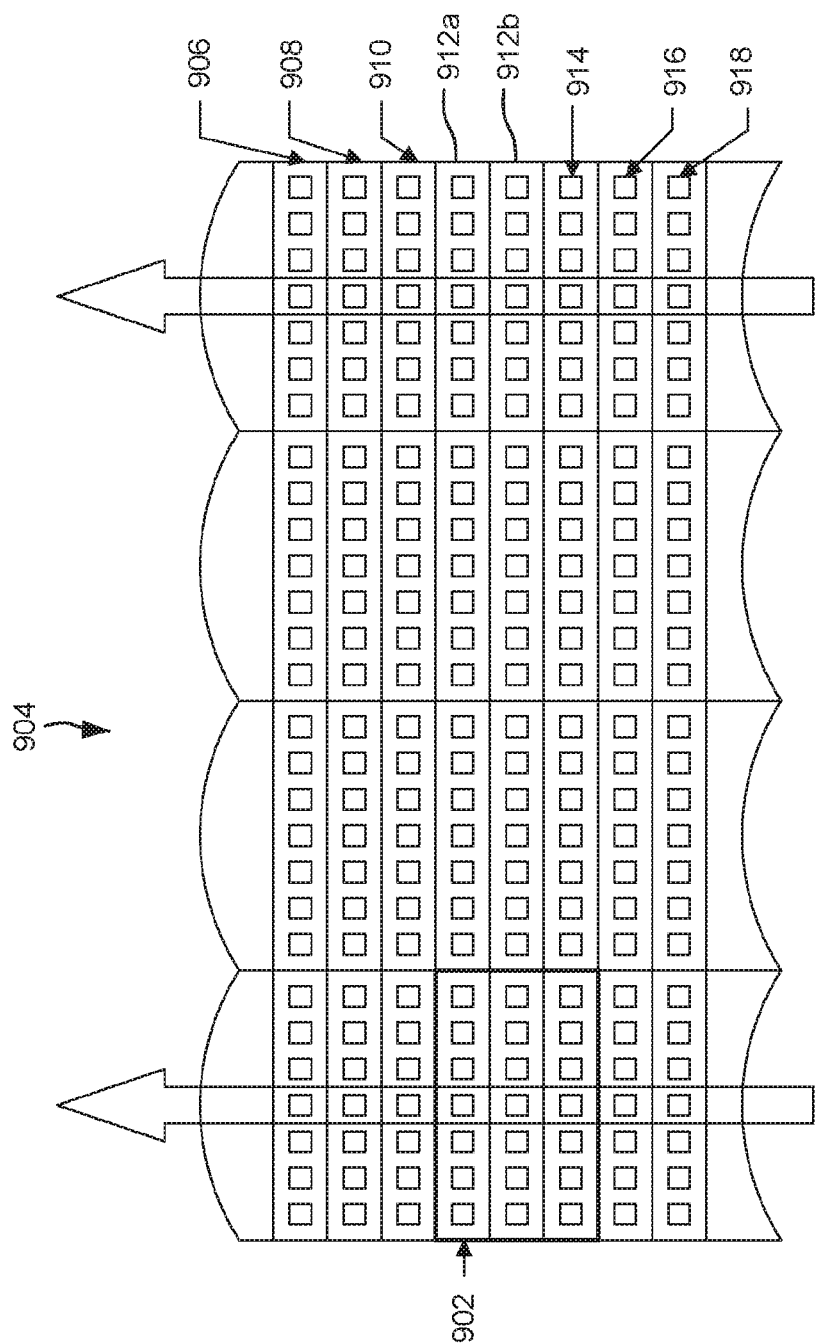
FIG. 9 is a schematic back view illustrating an example horizontal-only multiview full-color 3D display structure utilizing an angular filtering method according to some embodiments.

FIG. 9 is a schematic back view illustrating an example horizontal-only multiview full-color 3D display structure utilizing an angular filtering method according to some embodiments. In some embodiments of a full color multi-view display, the microlens or lenticular sheet may be divided into, e.g., three different interlaced stripes or zones that all have different angular filter properties tuned for the three different color source central emission wavelengths. FIG. 9 shows a schematic front view of one example display structure. The display is designed to project seven horizontal views. Each multidirectional display pixel 902 has seven red, green, and blue individually-addressable light sources assembled in horizontal rows, such as rows 912a, 912b, behind a vertically-oriented lenticular sheet 904. In this example, the pixels in each row 914, 916, 918 all have the same color. The sheet 904 has three alternating horizontal angular filter zones 906, 908, 910 that are aligned with the correct color-source rows. As each filter zone 906, 908, 910 is designed to have spectral transmission window centered to the source below it, coloration effects may be minimized. The different zones 906, 908, 910 may be manufactured by utilizing grid masks and a three-stage coating process where the different zones 906, 908, 910 are coated sequentially. For some embodiments, an optical layer may be a lenticular array.

Figure 10:
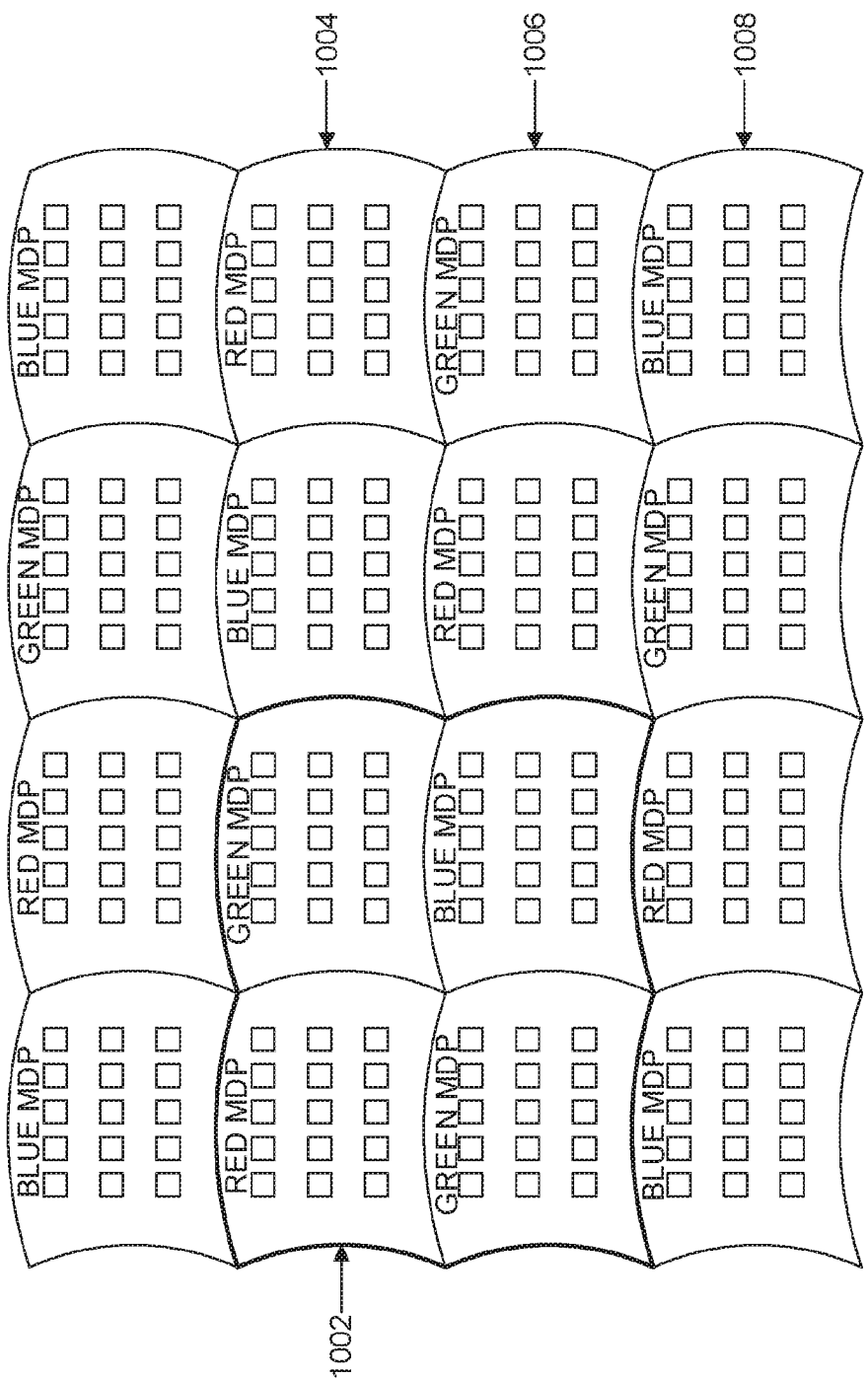
FIG. 10 is a schematic back view illustrating an example full-parallax multiview full-color 3D display structure utilizing an angular filtering method according to some embodiments.

FIG. 10 is a schematic back view illustrating an example full-parallax multiview full-color 3D display structure utilizing an angular filtering method according to some embodiments. FIG. 10 presents another example of a full color multiview display structure utilizing angular filtering. In this case, the display has full parallax as unique views may be projected to both vertical and horizontal directions. Matrices of single-color sources 1004, 1006, 1008 are placed behind microlenses with dedicated angular filter coatings for each color. A multidirectional three-color pixel 1002 may be formed, e.g., by combining the output from two green, one red and one blue multidirectional sub-pixel. Human visual system has lower spatial resolution sensitivity for color than for luminosity, and such a pixel structure may be used for optimizing the use of three different colors for higher perceived resolution. Some embodiments using dedicated angular filter coatings for each color have the benefit of added resolution in both vertical and horizontal directions, as green sub-pixels may be used for showing higher spatial resolution images than red and blue. This technique is in use in many digital camera systems using, for example, an arrangement with light detecting pixels referred to as Bayer matrix. A potential benefit of having different microlenses dedicated for different source colors is that the lenses may be specifically designed for each color separately. As the optical material refractive index is slightly different for each color, the color dispersion problem may be addressed by making the surface curvatures slightly different for red, green, and blue sources. An example optical layer be a substantially two-dimensional array of converging lenses. Some embodiments of a display device, light-emitting elements may underlie a corresponding interference layer region such that the light-emitting elements underlying the red-tuned interference layer regions are configured to emit substantially red light, the light-emitting elements underlying the green-tuned interference layer regions are configured to emit substantially green light, and the light-emitting elements underlying the blue-tuned interference layer regions are configured to emit substantially blue light. An example display device may include interference layer regions and an optical layer that is a substantially two-dimensional array of converging lenses, such that each interference layer region corresponds to a respective converging lens.

The angular filtering techniques described herein may be used with optical layers other than a microlens array. For example, the techniques described herein may be implemented with a mosaic optical layer. In some embodiments, the coating arrangement may be varied by using e.g. some white pixels in the directional sub-pixel matrix for boosting luminosity. This feature may be used e.g. for high dynamic range (HDR) images. In this case the white pixels may not use the angular filters due to directional coloration. However, in some cases the coloration may be employed as an advantage e.g. in calibrating the display color saturation to different projection directions with the help of white emission filtered to colored light. Directional coloration occurs naturally when white light goes through the angular coating that connects color transmission window to incidence angle. With suitable alignment of sources and their emission directions to the projecting lens surface geometry, different colors may be projected to different directions.

Figure 11:
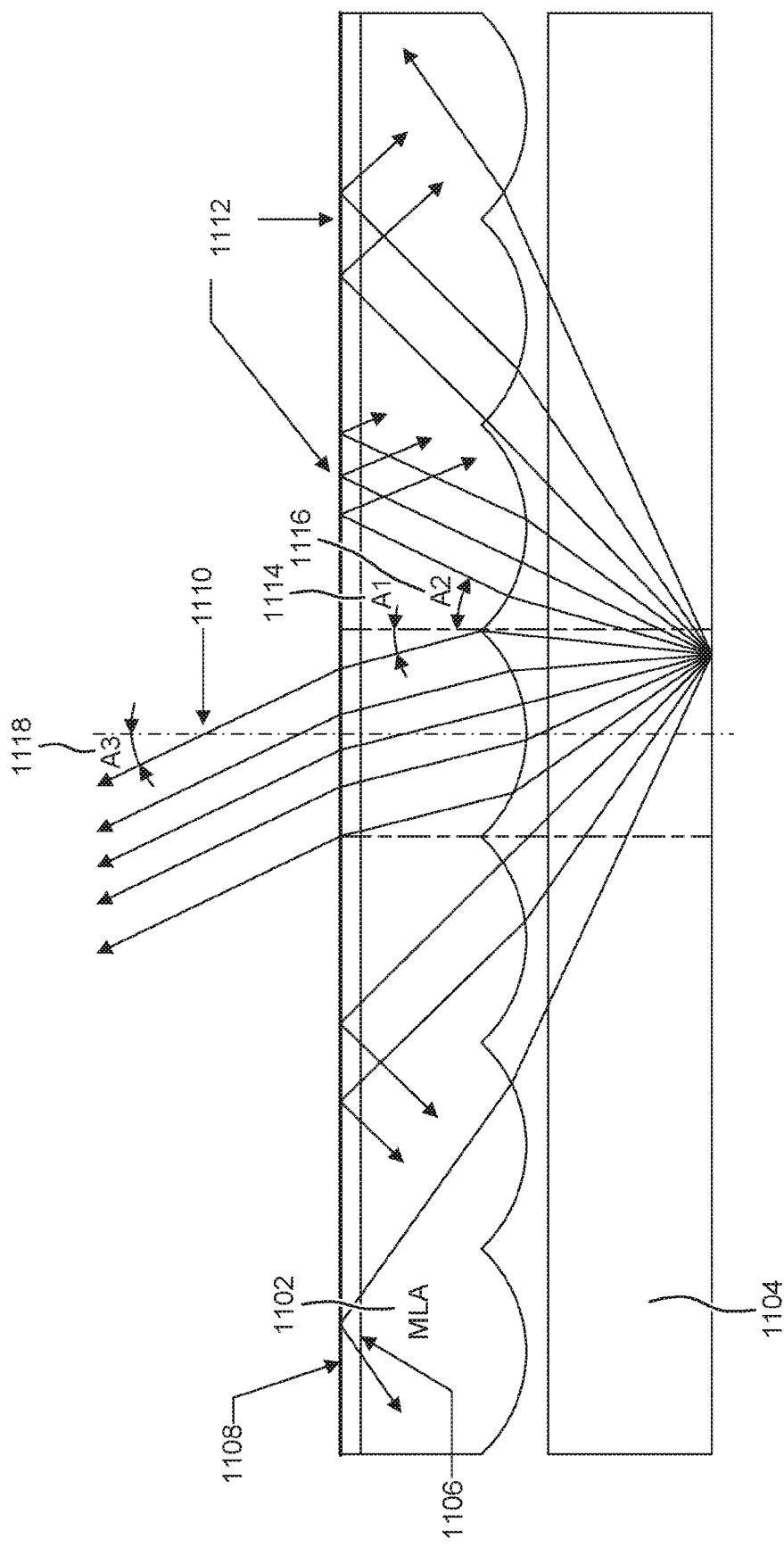
FIG. 11 is a schematic cross-sectional view illustrating an example geometry of an alternative multiview display structure with angular filter coating according to some embodiments.

FIG. 11 is a schematic cross-sectional view illustrating an example geometry of an alternative multiview display structure with angular filter coating according to some embodiments. In this case, the source layer cannot be reached directly with the lenticular or microlens structure, and the imaging component is placed farther away from the light emitting sources. The optical component is reversed in order to obtain the best combination of lens focal length, aperture size, display FOV and number of views. One example of such a situation is when the pixels are behind a relatively thick protective glass window 1104, like in the case of, e.g., a mobile phone OLED display. As the lens component is reversed, the lens shapes are able to collimate the imaging beams at the MLA 1102 first interface between air and lens material. These collimated beams hit the second surface of the optical sheet as parallel ray bundles. An angular-filter coating 1108 may be applied to this second lens material-air interface that is flat, potentially making it easier to manufacture the multiple thin coating layers evenly over the whole display surface. The component also may feature an additional graded index (GRIN) coating layer 1106 that is designed for fine-tuning the ray angles for a specific angular coating design. These layers may be made from different refractive index materials and they may be somewhat thicker, in the range of several micrometers. The GRIN layer 1106 may also have a custom refractive index profile made by, e.g., an oblique angle material deposition method that is used for porous material creation and refractive index tuning.

An embodiment as in FIG. 11 may be well suited to the use of the angular coating 1108 as the rays emitted to the intended view directions 1110 have smaller incidence angles than the rays emitted to the stray light secondary view directions 1112. In FIG. 11, angle A1 (1114) presents the direction of the desired ray bundle and angle A2 (1116) shows the direction of secondary stray light image from the same emission point. By placing the filter cut-off angle directly between the wanted and unwanted ray angles, most of the stray light may be blocked from exiting the optical structure. The use of more than one lens component layer may give better possibilities to position the angular filter layer to the integral imaging optical structure and there is a potential to obtain larger improvements to stray light performance if the angular coating is considered as integral part of the design process.

Figure 12:
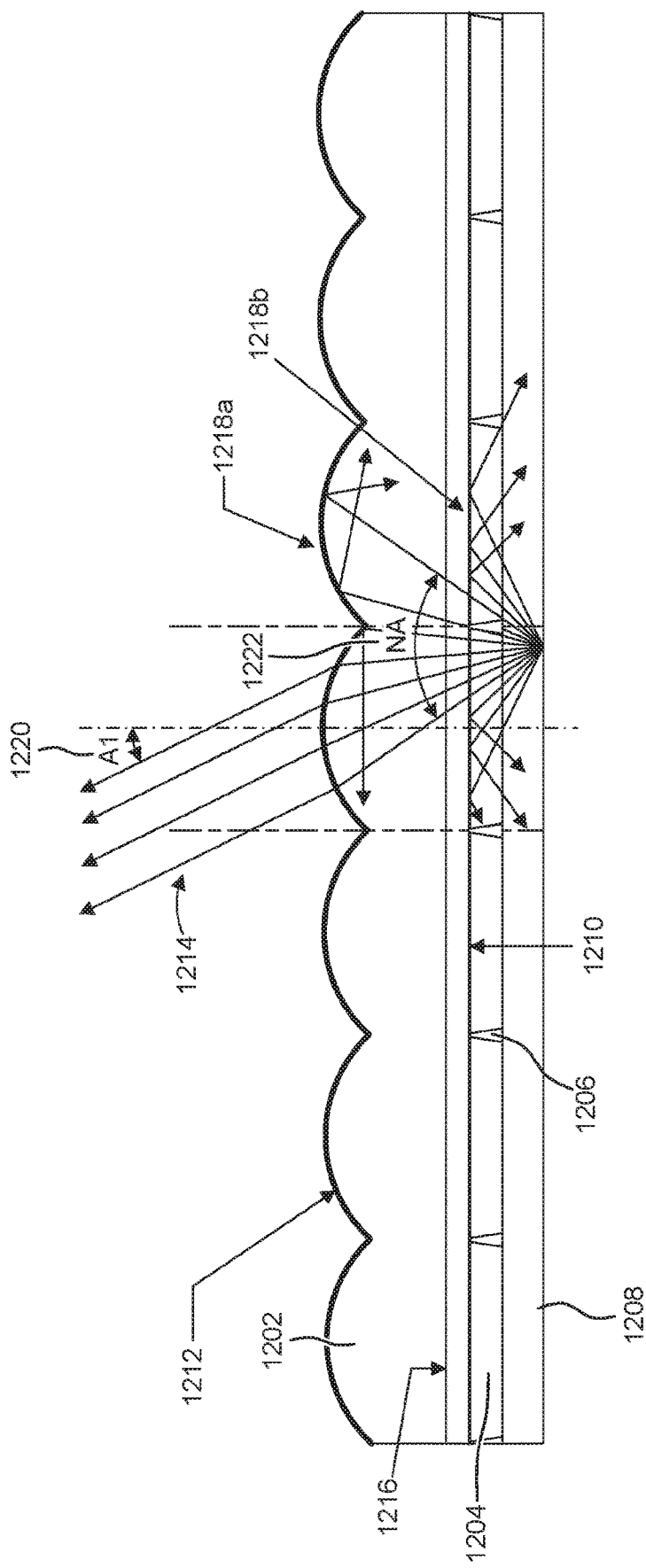
FIG. 12 is a schematic cross-sectional view illustrating an example alternative multiview display structure with two layers of angular filter coatings according to some embodiments.

FIG. 12 is a schematic cross-sectional view illustrating an example alternative multiview display structure with two layers of angular filter coatings according to some embodiments. In this example, the source is behind a relatively thin protective window 1208, which still prohibits direct contact with the sources but allows use of the lenticular sheet in the optically better orientation where the curved surface is facing a direction away from the sources. The arrangement also allows low baffle/support structures 1206 between neighboring multidirectional pixels with air 1204 in-between the baffles 1206 for some embodiments. A first angular filter layer 1210 is coated on the flat surface of the MLA 1202, and the first angular filter layer 1210 filters out emitted light rays that are above a specified numerical aperture (NA) angle value 1222. This helps in blocking some rays from entering the MLA 1202 that would otherwise hit the neighboring lens surfaces. As the baffle structures 1206 are forced to be shallow by the available optical components, there are still some ray paths that pass these blocking structures 1206 both from the protective window side 1208 and from the open bottom aperture side of the dedicated lens. These rays are blocked with the second angular filter coating 1212 applied to the curved lens surfaces. An additional GRIN layer 1216 may help in bending some ray paths to more advantageous angles towards the second coating. The GRIN layer 1216 may also somewhat widen the achievable FOV of the directional pixel, after the first angular filter has limited source NA 1222 adequately. Together, the two angular filter coatings 1210, 1212 form an angular window, which all light rays will have to pass. The example structure allows rays propagating to the designed view direction 1214 to propagate at an angle A1 (1220). Through selective use of the optical geometry, this angular window may be configured to block considerably more stray light, as shown at 1218a, 1218b, than the light intended for image formation.

For some embodiments, a display device may include an angular filter that is a coating on at least one surface of the optical layer. The optical layer may include a substantially planar surface and a non-planar surface. The angular filter coating may be on the non-planar surface or on the substantially planar surface of an optical layer. The angular filter layer may include a bandpass interference filter layer, and the bandpass interference filter layer may include a coating on at least one surface of the optical layer. The bandpass interference filter coating may be on the non-planar surface or on the substantially planar surface of an optical layer.

Example Interference Filters

In some embodiments, the angular filter is implemented with a dielectric thin-film interference filter. A dielectric thin-film interference filter may include a plurality of layers of at least two materials having different refractive indices with thickness of approximately one-quarter of a wavelength of a predetermined wavelength of light within the respective material. Each such layer may be referred to as a quarter-wavelength layer. The thin-film interference filter may include alternating layers of two different materials with relatively higher and relatively lower refractive indices. In some embodiments, the dielectric thin-film interference filter includes at least four quarter-wavelength layers.

In some embodiments, the dielectric thin-film interference filter is a bandpass filter. A dielectric thin-film bandpass filter may include, in addition to a plurality of quarter-wavelength layers, at least one half-wavelength layer with a thickness of approximately one-half of a wavelength of a predetermined wavelength of light within the respective material. The properties (including passband) of a dielectric thin-film interference filter may be tuned by selecting different numbers, thicknesses, and refractive indices of layers according to known techniques.

In some embodiments, different passbands may be selected for different regions. For example, filter regions overlying red pixels may be tuned for red light, filter regions overlying green pixels may be tuned for green light, and filter regions overlying blue pixels may be tuned for blue light.

The passband of a dielectric thin-film bandpass filter is different for different angles of incidence. As a result, some wavelengths of light that fall within the passband (and thus are transmitted) at a small angle of incidence nevertheless fall outside the passband (and are reflected) at a larger angle of incidence. A thin-film bandpass filter may thus be used as an angular filter in some embodiments.

Some embodiments of a display device may include at least four dielectric layers that have a thickness approximately equal to one-quarter of a wavelength, in the respective layer, of the predetermined wavelength of light. The display device may include an angular filter such that the angular filter includes a bandpass interference filter layer. The bandpass interference filter layer may be along an optical path from the fight-emitting layer to an exterior of the display device. The bandpass interference layer may include different interference layer regions with different passbands.

Performance of an Example Embodiment

Figure 13:
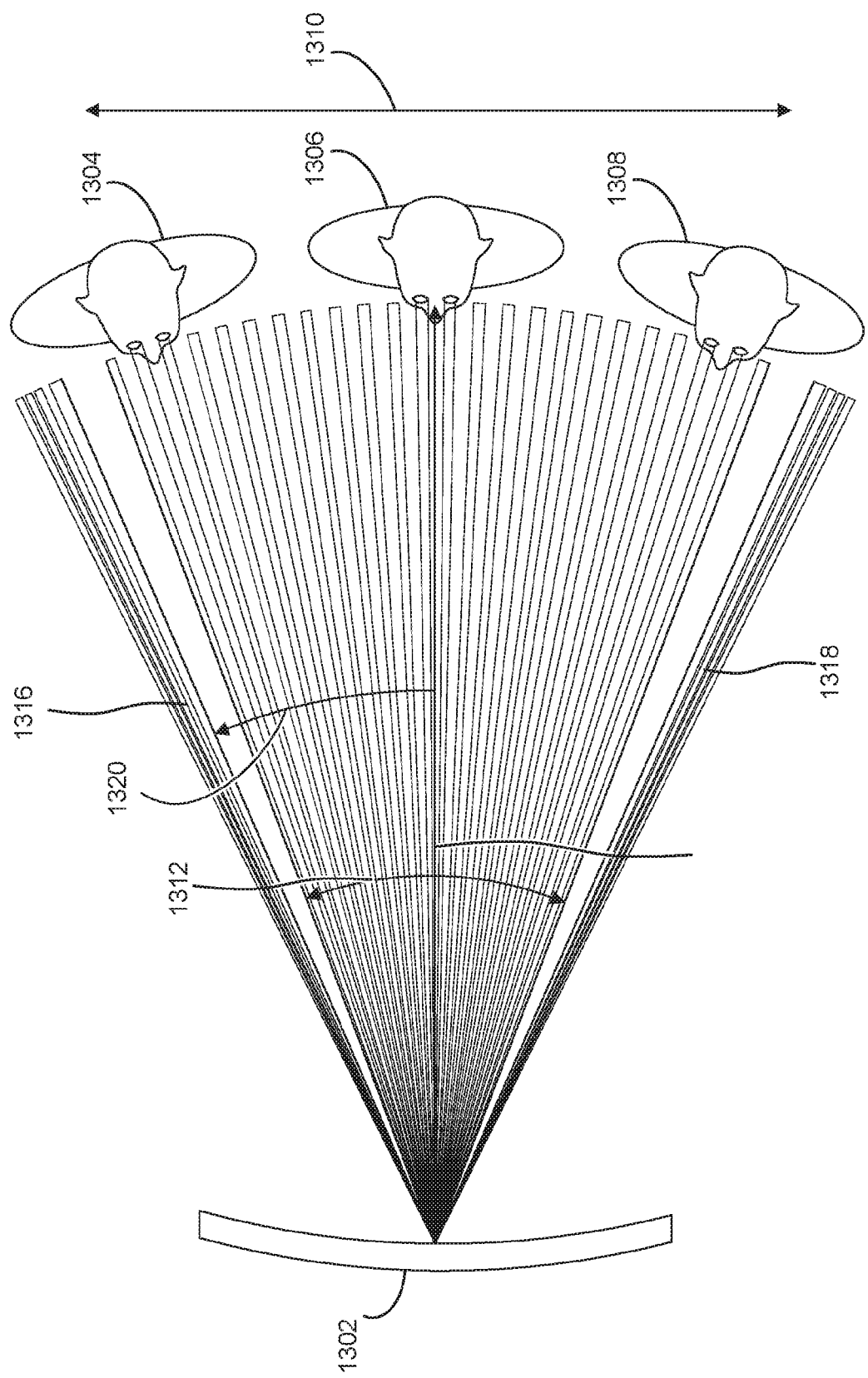
FIG. 13 is a schematic plan view illustrating an example system where a tabletop 44" multiview 3D display is viewed from a distance of 2 m by three observers according to some embodiments.

FIG. 13 is a schematic plan view illustrating an example system where a tabletop 44" multiview 3D display is viewed from a distance of 2 m by three observers according to some embodiments. FIG. 13 is a plan view illustrating viewing conditions of an example use case. In the embodiment of FIG. 13, a display 1302 with a 44" multiview 3D screen is placed at 2 m viewing distance 1314 from three viewers 1304, 1406, 1308. The FOV 1312 of the display is 41°, making it possible to show the image to multiple viewers at the same time for a shared experience. The display is curved in order to overlap projected view directions from all parts of the display area at the designated viewing distance. A total of 47 horizontal views are created with the display structure that is based on a custom monochrome OLED panel and a lenticular sheet. As the display is designed for shared 3D imaging for an unlimited number of viewers, eye tracking is not used, and all the views are generated simultaneously. Secondary views 1316, 1318 are projected as stray light to both sides of the intended viewing window, starting from angles 24° (1320) off from the central direction.

Figures 14A, 14B:
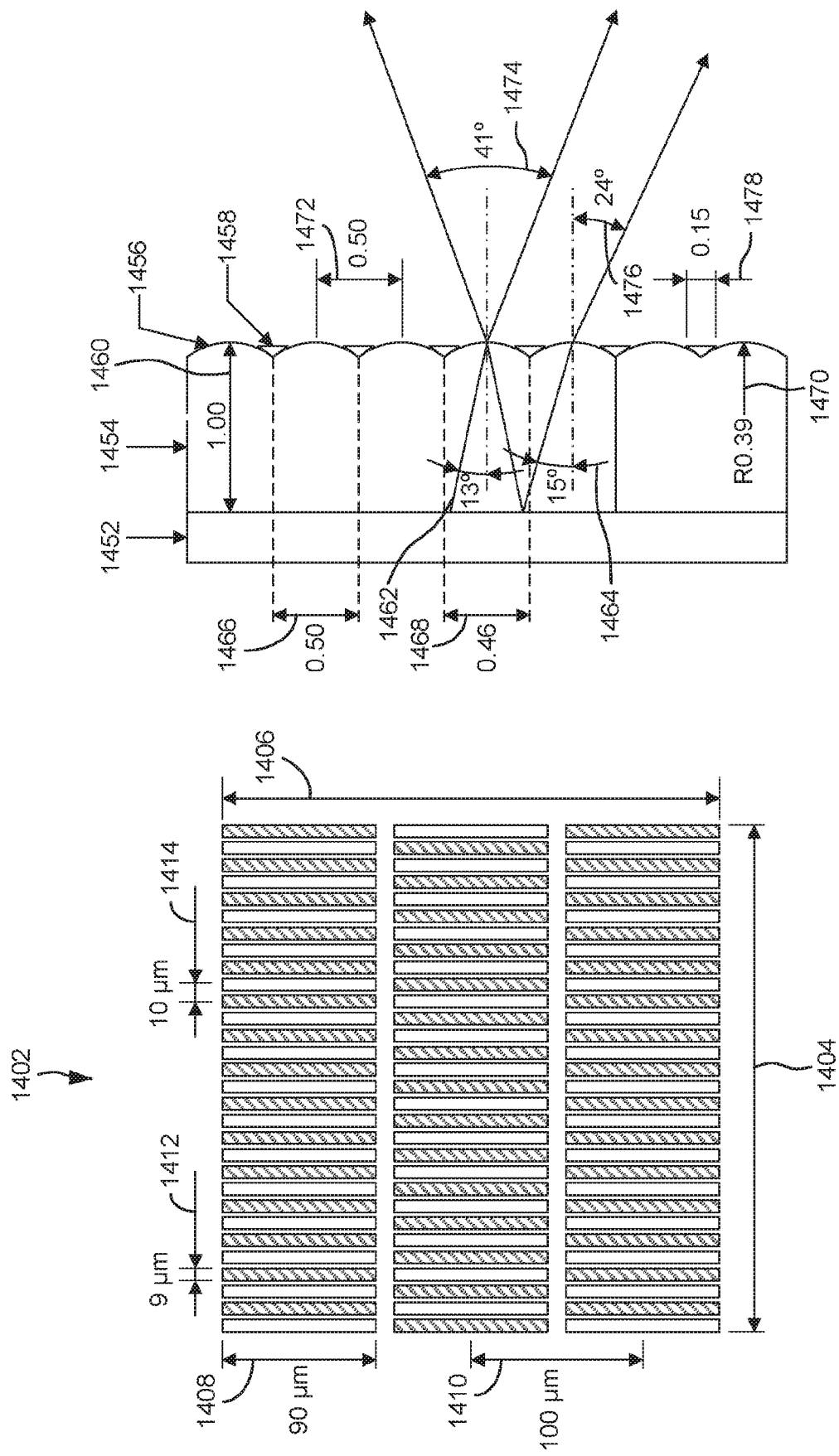
FIG. 14A is a schematic front view illustrating an example OLED panel pixel geometry with measurements according to some embodiments.

FIG. 14A is a schematic front view illustrating an example OLED panel pixel geometry with measurements according to some embodiments. FIG. 148 is a schematic cross-sectional view illustrating an example optical structure with measurements according to some embodiments. FIGS. 14A-14B illustrate schematics and measurements of the OLED pixel and display optical structure 1402 used in the example of FIG. 13. A monochrome OLED panel 1452 with 9 μm (1412) by 90 μm (1408) pixels with 10 μm (1414) by 100 μm (1410) pixel pitch is used for creating the different view images. The example OLED pixel geometry 1402 shows 3 sub-pixels per column in the vertical direction 1406 and 15 sub-pixels per row in the horizontal direction 1404. A 1 mm thick (1460) lenticular sheet (MLA) 1454 made from polystyrene projects the pixel images to the designed FOV of 41° (1474). Lens pitch is 0.5 mm (1466, 1472) and focal length 1 mm. An angular filter thin film stack 1456 is coated directly to the lenticular surfaces. Printed lines between lenses act as baffles that reduce stray light Three pixels are left dark in the OLED panel 1452 at the borderlines between lenses in order to further reduce the amount of stray light. The distance between the centers of outermost pixels under each lens is 0.46 mm (1468). In some embodiments, each unit has 47 sub-pixels that produce unique views to the horizontal direction. A ray emitted from the OLED panel 1452 by an outermost pixel of a unit to the center of a lens is emitted at an angle of 13° (1462). A stray ray emitted by an outermost pixel of a unit to the center of a lens associated with a neighbor unit is emitted at an angle of 15° (1464). Such a stray ray is bent to an angle of 24° (1476) after passing through the lens. Between lenses, there may be a printed baffle 1458. An example printed baffle has a width of 0.15 mm (1478). A lens may have a radius of 0.39 mm (1470).

Figure 15A:
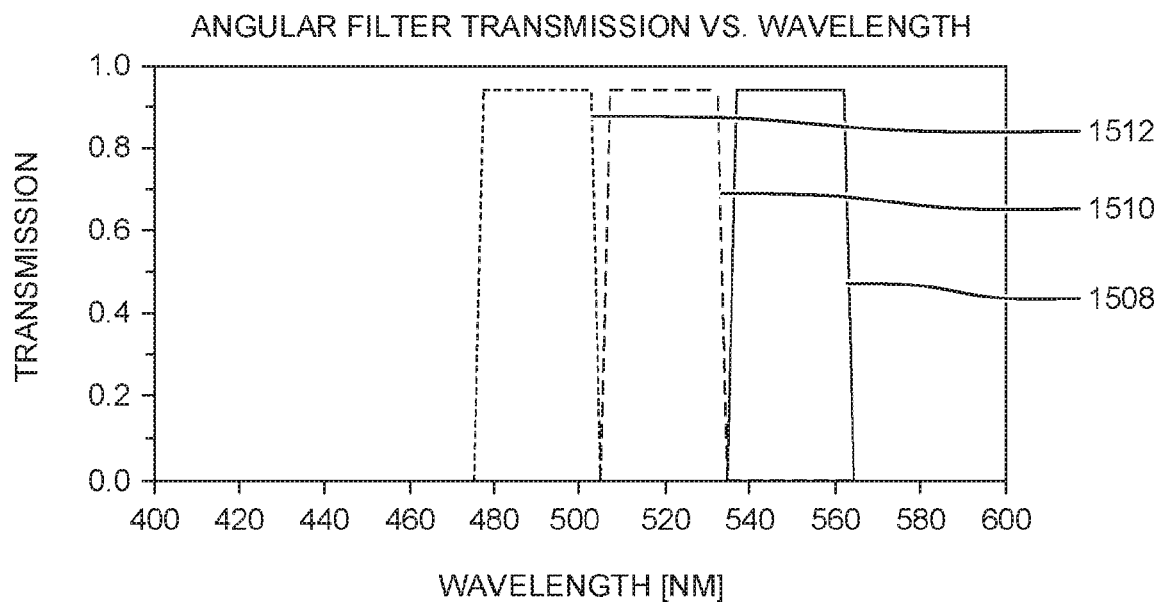
FIG. 15A is a graph of transmission vs. wavelength illustrating angular filter coating properties according to some embodiments.

FIG. 15A is a graph of transmission vs. wavelength illustrating angular filter coating properties according to some embodiments. FIGS. 15A-15D are graphs illustrating optical properties of the angular filter coating. FIG. 15A's graph of angular filter transmission vs. wavelength shows the relation between light wavelength and filter transmission at three different ray incidence angles (0° (1512), 30° (1510), and 60° (1508)) and averaged polarization. The transmission window at 0° incidence angle was fitted to the source central emission wavelength of green 550 nm. The spectral width of the sources was 20 nm, which means that the filter was transmitting the maximum of 95% of incident light at this nominal angle.

Figure 15B:
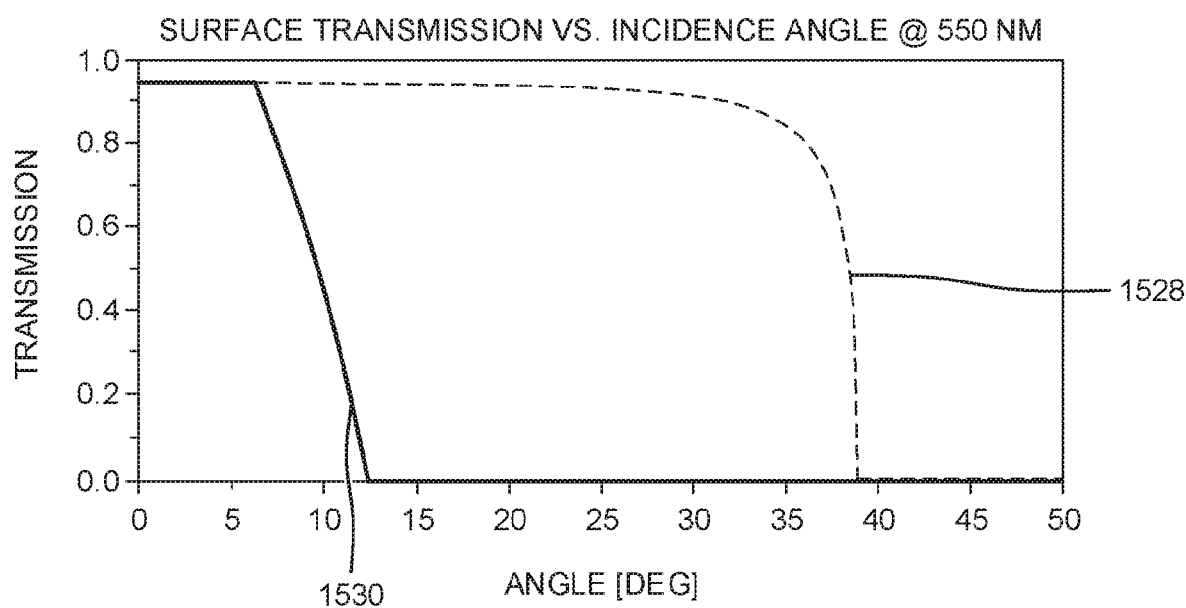
FIG. 15B is a graph of transmission vs. incidence angle illustrating angular filter coating properties for wavelengths of 550 nm according to some embodiments.

FIG. 15B is a graph of transmission vs. incidence angle illustrating angular filter coating properties for wavelengths of 550 nm according to some embodiments. FIG. 15B's graph of surface transmission vs. wavelength shows the relation between incidence angle and transmission at the 550 nm wavelength. The angular filter transmission trace 1530 shows that substantially no light is transmitted at the central wavelength with incidence angles above ~12°. FIG. 15B also shows the transmission trace 1528 of a bare polystyrene-air interface with averaged polarization.

Figure 15C:
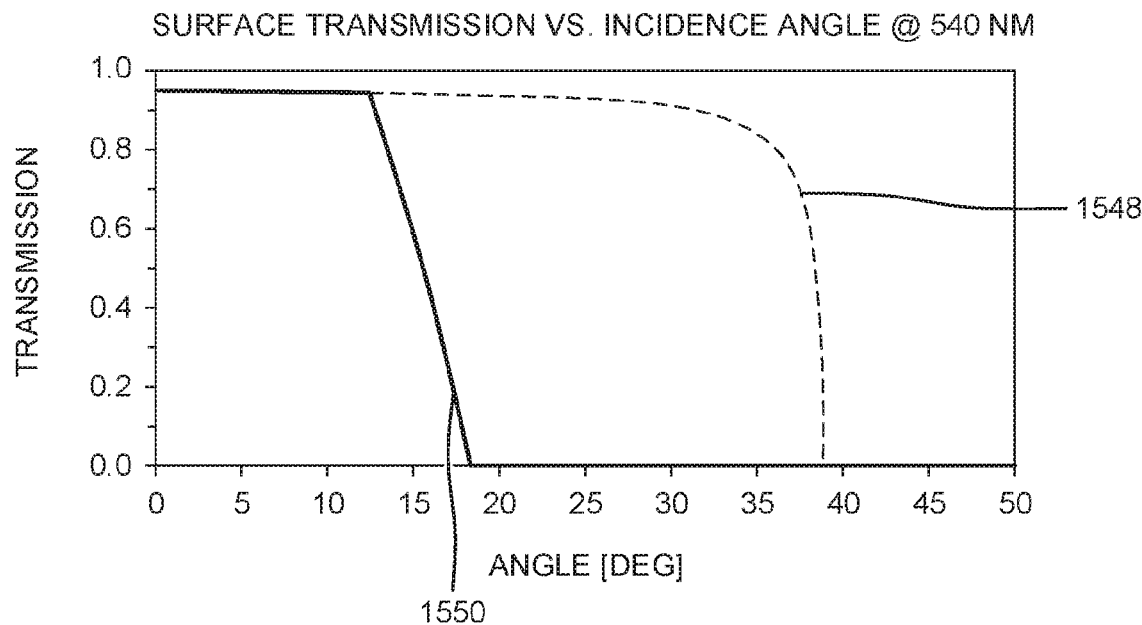
FIG. 15C is a graph of transmission vs. incidence angle illustrating angular filter coating properties for wavelengths of 540 nm according to some embodiments.

FIG. 15C is a graph of transmission vs. incidence angle illustrating angular filter coating properties for wavelengths of 540 nm according to some embodiments. FIG. 15C's graph of surface transmission vs. wavelength shows the relation between incidence angle and transmission at the 540 nm wavelength. The angular filter transmission trace 1550 shows that substantially no light is transmitted at the central wavelength with incidence angles above ~18°. The transmission angular window is somewhat larger with the lower 540 nm wavelength. FIG. 15C also shows the transmission trace 1548 of a bare polystyrene-air interface with averaged polarization.

Figure 15D:
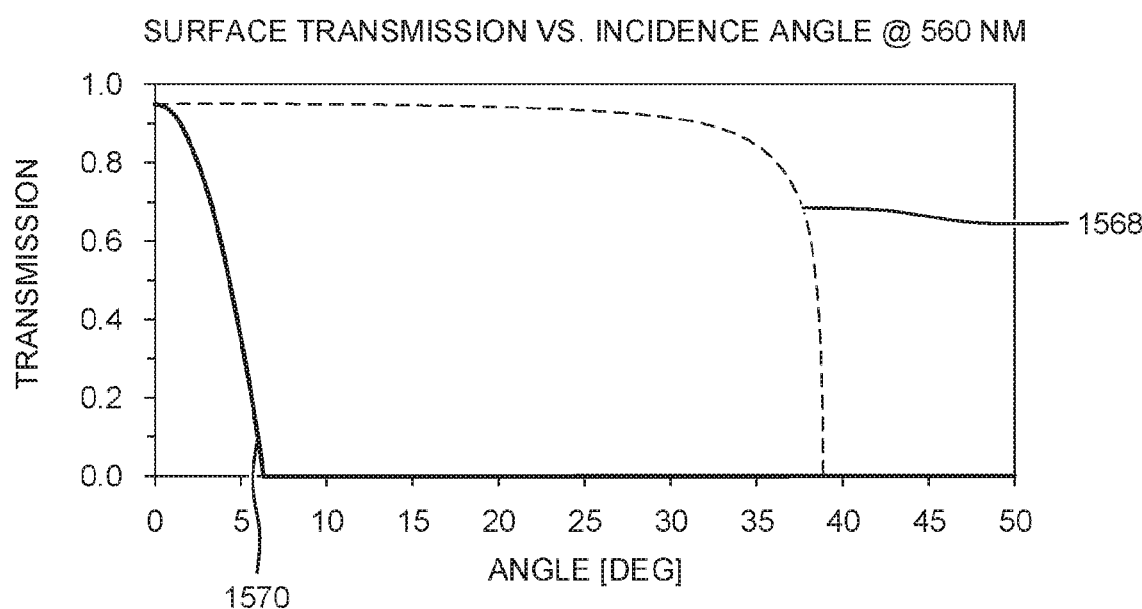
FIG. 15D is a graph of transmission vs. incidence angle illustrating angular filter coating properties for wavelengths of 560 nm according to some embodiments.

FIG. 15D is a graph of transmission vs. incidence angle illustrating angular filter coating properties for wavelengths of 560 nm according to some embodiments. FIG. 15D's graph of surface transmission vs. wavelength shows the relation between incidence angle and transmission at the 550 nm wavelength. The angular filter transmission trace 1570 shows that substantially no light is transmitted at the central wavelength with incidence angles above ~6°. The transmission angular window is somewhat smaller with the higher 560 nm wavelength. FIG. 15D also shows the transmission trace 1568 of a bare polystyrene-air interface with averaged polarization.

Figure 16A:
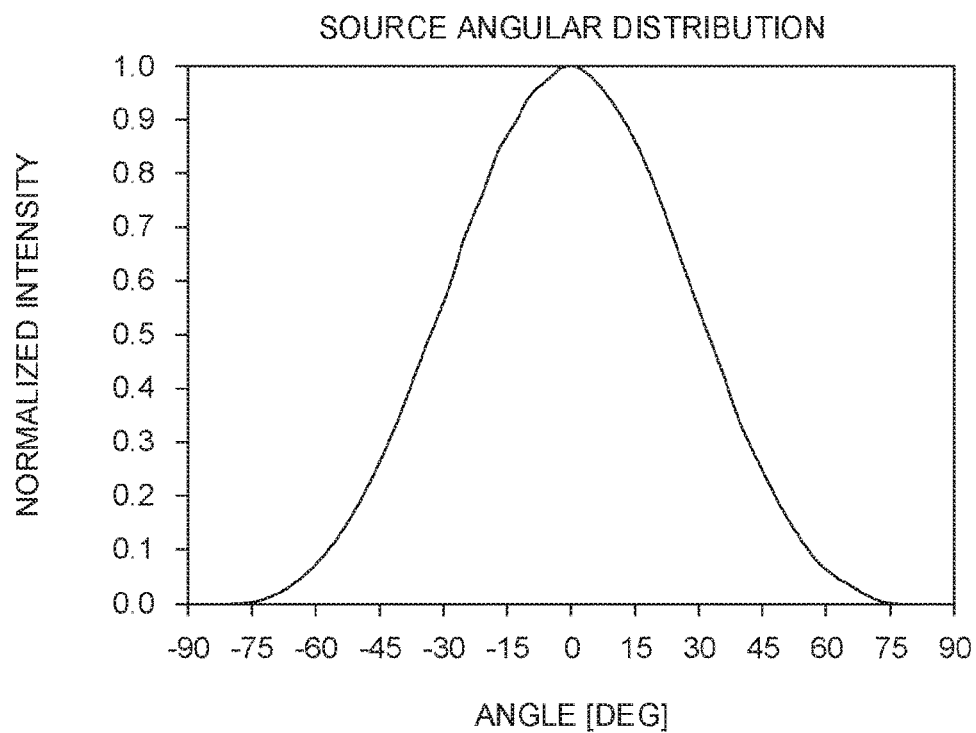
FIG. 16A is a graph showing an example angular distribution of light sources used in simulations according to some embodiments.

FIG. 16A is a graph showing an example angular distribution of light sources used in simulations according to some embodiments. In order to test optical functioning of the system of FIGS. 13-15, a set of raytrace simulations was performed with commercial optical simulation software OpticsStudio 17. Three 9 μm wide sources were placed under the lenticular lens structure to the 1 mm focal length distance. One source was positioned at the optical axis of the lens and two sources were placed at 0.23 mm distance on both sides of the axis. FIG. 16A's graph of source angular distribution shows normalized intensity vs. angle of incidence. Angular divergence of sources was set to a Gaussian distribution with full-width-half-maximum (FWHM) value of 34° shown in FIG. 16A. With this angular distribution, light emitted by a single source was able to easily reach the next two neighboring lens apertures and especially at the 0.23 mm off-axis point.

Figure 16B:
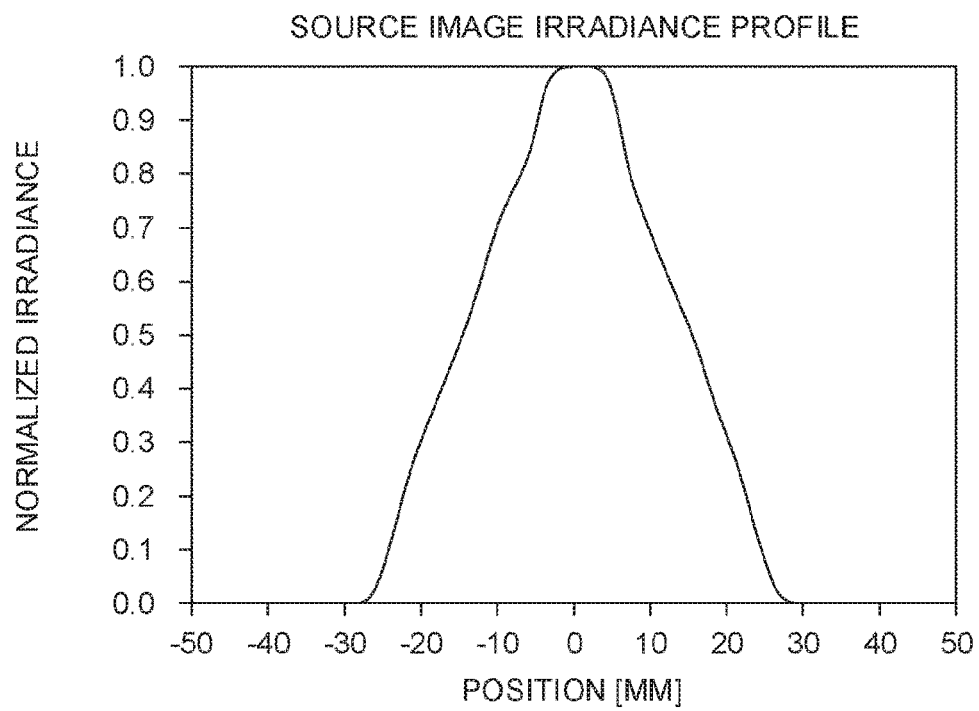

FIG. 16B is a graph showing an example irradiance distribution of a single source imaged to a viewing window distance according to some embodiments. FIG. 16B's graph of source image irradiance profile shows normalized intensity vs. position for a single, centrally located, 9 μm wide source at the designated viewing distance. Distribution profile is not purely Gaussian due to the baffles and angular filtering. The FWHM width is 30 mm and the whole image width is ~55 mm, which is well below the average distance between two eye pupils. This means that the image of a single source is visible to one eye only at the 2 m viewing distance and stereoscopic images may be created with the optical design.

Four different comparison simulations were made in order to show the effect of the angular filter coating to stray light reduction. FIGS. 17A to 17D show simulated irradiance distributions of the three sources imaged by the lenticular lens to the 2 m distance viewing window.

In all of the simulated irradiance distribution graphs, the tall and narrow central peak comes from the central source, which light is mostly transmitted through the intended lens. The height of this peak was used for normalizing the irradiance distributions to a maximum value of 1. The side peaks located at ±750 mm positions come from the two separate sources on each side of the lens center. They are used for extreme views inside the intended FOV. These peaks are much lower than the central peak due to the fact that a large portion of light emitted by the sources hit the neighboring lenses and create secondary pixel stray light images shown as additional peaks in the graphs at positions ±890 mm.

Figure 17A:
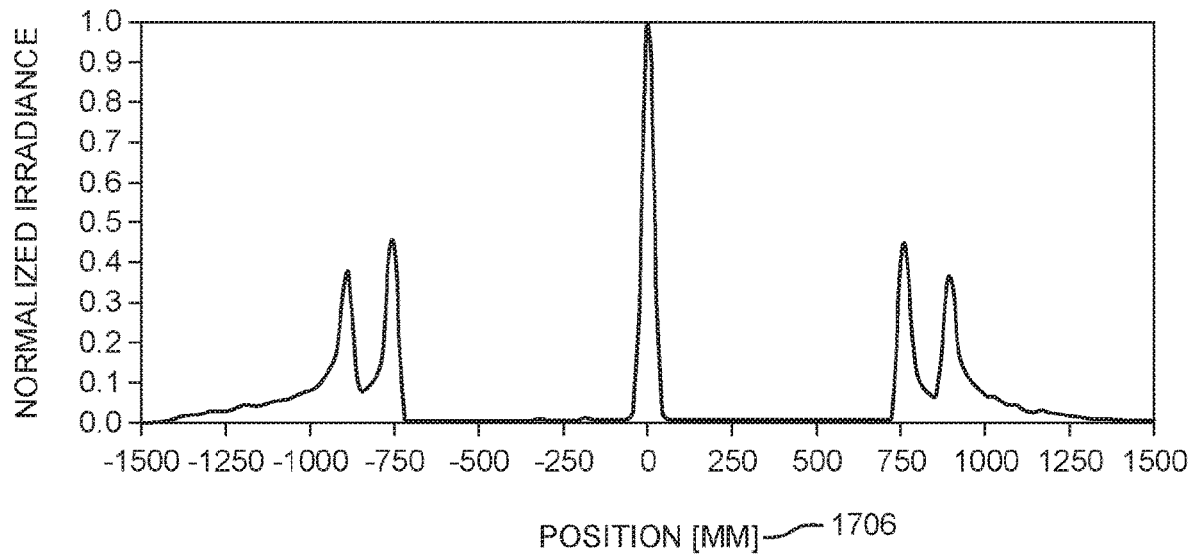
FIG. 17A is a graph showing an example irradiance distribution at the viewing window for an uncoated lenticular sheet without baffles according to some embodiments.
Figure 17B:
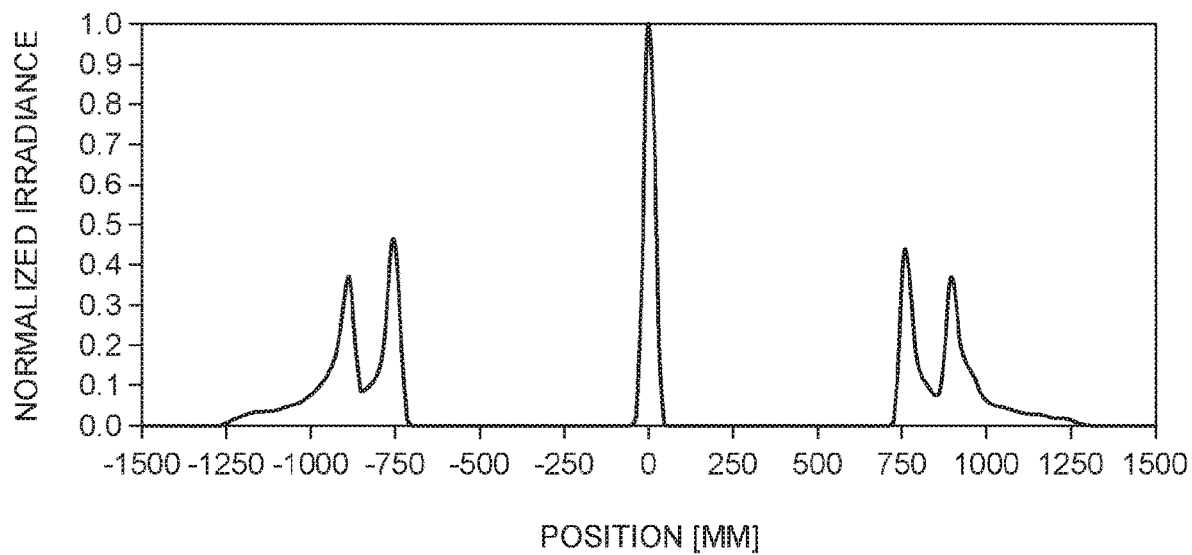
FIG. 17B is a graph showing an example irradiance distribution at the viewing window for an uncoated lenticular sheet with baffles according to some embodiments.

FIG. 17A is a graph showing an example irradiance distribution at the viewing window for an uncoated lenticular sheet without baffles according to some embodiments. FIG. 17A shows the distribution with an uncoated lenticular sheet without baffles. FIG. 17A is a graph of normalized irradiance vs. position that shows without any stray light suppression structures, there will be some evenly spread stray light between the central image peak and side view image peaks. This light originates from the rays scattered at the borderline shapes between lenticular lenses. Irradiance values are only about 1% from the central peak, but as the light is spread over a large area, it is accumulated when all of the views are used, and it may notably reduce image contrast. FIG. 17B shows that by adding the printed baffles between lenses, it is possible to block this part of the stray light almost completely.

FIG. 17B is a graph showing an example irradiance distribution at the viewing window for an uncoated lenticular sheet with baffles according to some embodiments. FIG. 17B shows how the stray light is reduced by adding the designed light absorbing printed baffles between lenses. FIG. 17B is a graph of normalized irradiance vs. position that shows that baffles alone are not able to block the stray light propagating to secondary image directions. In FIGS. 17A and 17B, the designed extreme side view peaks at ±750 mm positions are fused together with the secondary image peaks located at ±890 mm positions. In practice this would mean that if the viewer eye is placed at the very edge of the FOV, the secondary peak would cause a lot of contrast-reducing stray light. This secondary view projection would also confusingly show a very different image as it was intended to be projected to the other side of the FOV. The borderline between intended viewing window and area outside the FOV would become blurred as the transition from the intended view to the shifted image would be continuous. Such a feature would make the edge views practically unusable and they would force reduction of FOV by widening the gap of unused pixels between individual lenticular lenses in the emitter matrix.

Figure 17C:
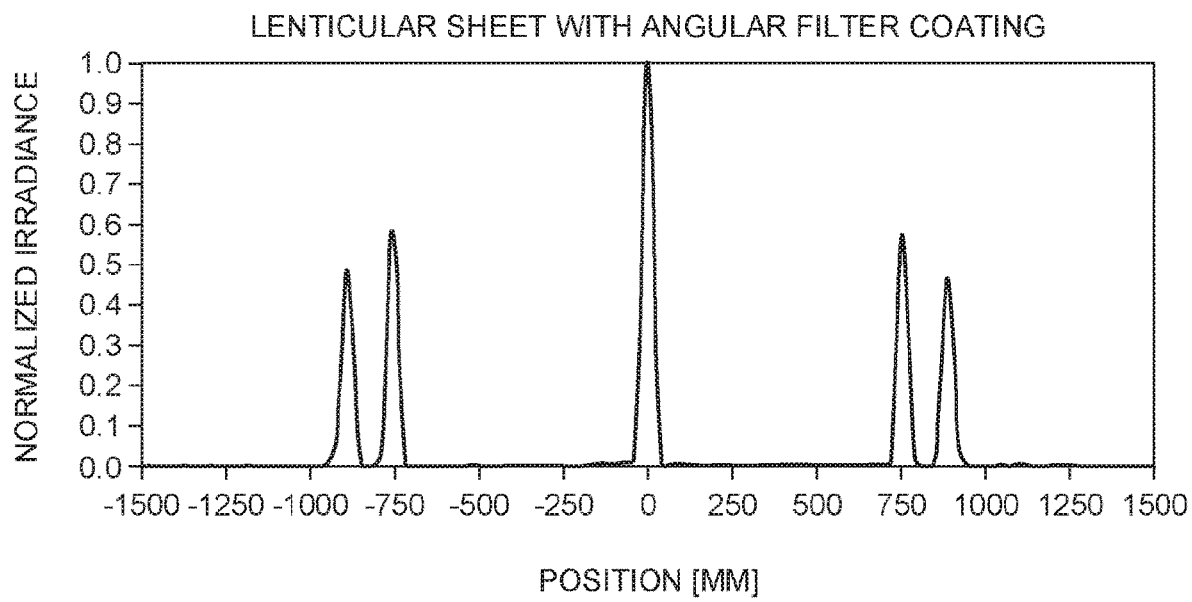
FIG. 17C is a graph showing an example irradiance distribution at the viewing window for an angular filter coated lenticular sheet without baffles according to some embodiments.

FIG. 17C is a graph showing an example irradiance distribution at the viewing window for an angular filter coated lenticular sheet without baffles according to some embodiments. FIG. 17C shows effects of the angular filter coating on stray light suppression without baffles. FIG. 17C is a graph of normalized irradiance vs. position that shows the full effect of angular filter coating. In this case, there were no baffles between the lenses, and there is again some stray light between the view peaks. These stray light irradiance values have now been reduced by ~40-60% as the angular filter cuts off some of the light propagating angles. This effect is noticeable but may still not be adequate due to the large spread and accumulative nature of this stray light component. A much larger effect may be seen in the side view peaks as the intended views at ±750 mm positions are now totally separated from the secondary image peaks at ±890 mm. This means that the angular filters are able to create a clear gap between the intended FOV and the zones where the secondary views are visible. The width of this gap is larger than two times the average distance between eye pupils, which means that if a viewer moves just outside the intended FOV, the image will be totally faded out. This makes the borderline clear for the viewer and improves display use comfort considerably as the FOV may be kept larger and there is no confusion on where the intended view zone starts.

Figure 17D:
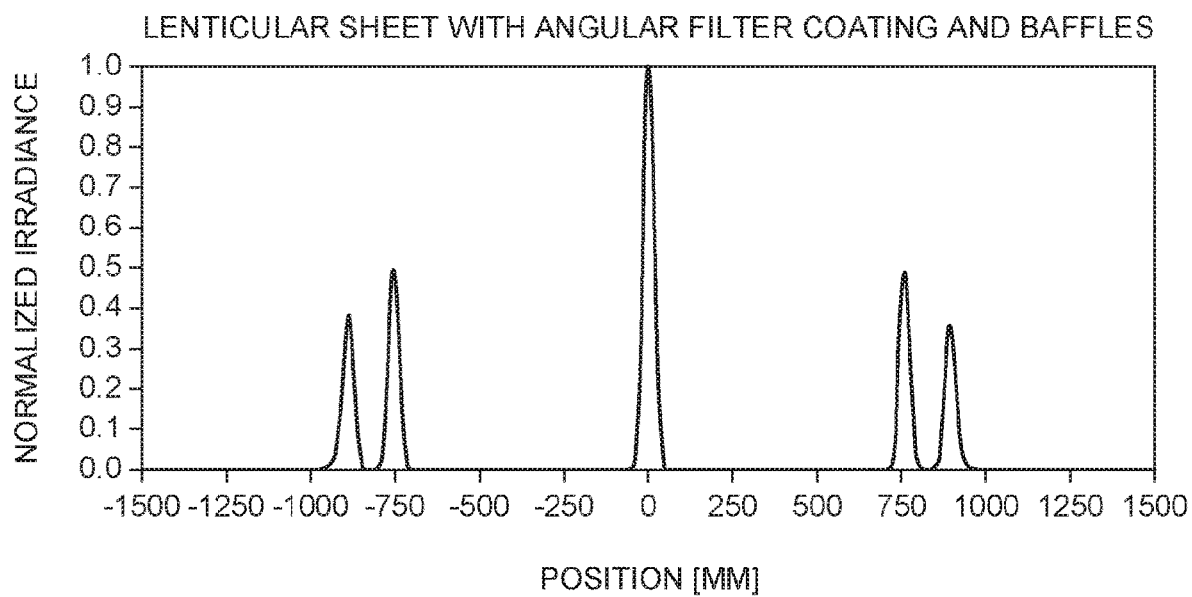
FIG. 17D is a graph showing an example irradiance distribution at the viewing window for an angular filter coated lenticular sheet with baffles according to some embodiments.

FIG. 17D is a graph showing an example irradiance distribution at the viewing window for an angular filter coated lenticular sheet with baffles according to some embodiments. FIG. 17D shows effects of the angular filter coating on stray light suppression with baffles. FIG. 17D is a graph of normalized irradiance vs. position.

Another potential benefit of the angular filters may be seen by comparing the central and side view irradiance peaks of FIGS. 17A and 17C. Without filters, the side view images have only about 45% from the brightness of images projected to the center. Source dynamic range may be adjusted for compensating this difference in order to obtain an evenly bright image in all directions. When the angular filter is used, the side peaks are relatively higher, about 60% from the central peak and there is much less need for dynamic range adjustment. This benefit is somewhat reduced when the baffles are added together with the angular filters as shown in FIG. 17D. Both of these stray light suppressing features may be employed for a good multiview 3D image, but the angular filter generally gives greater benefit than the baffles alone.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A multiview display device comprising:
a light-emitting layer comprising an addressable array of light-emitting elements;
an optical layer overlaying the light-emitting layer, the optical layer comprising an array of lenses, wherein each respective lens overlays a group of light-emitting elements of the array of light-emitting elements and wherein light emitted from a light-emitting element of the group of light-emitting elements is collimated by the respective lens into a primary direction and collimated by another lens into a secondary direction; and
an interference filter layer along an optical path from the light-emitting layer to an exterior of the display device, the interference filter layer being operative to substantially block the light collimated into the secondary direction and to substantially transmit the light collimated into the primary direction, wherein light is transmitted if emitted from the light-emitting layer with emission angle smaller then than a first angle and is blocked if hit the optical layer with an incident angle larger than a second angle.

2. The display of claim 1, wherein the optical layer is a substantially two-dimensional array of converging lenses.

3. The display of claim 1, wherein the optical layer is a lenticular array.

4. The display of claim 1, wherein the interference filter layer comprises:
a first coating on the flat lens surface of the optical layer, the first coating being operative to transmit light from the light-emitting layer having an emission angle smaller than the first angle; and
a second coating on the curved lens surface of the optical layer, the second coating being operative to block light transmitted by the first coating having an incident angle greater than the second angle.

5. The display of claim 1, wherein the interference filter layer comprises an interference filter having a plurality of dielectric layers.

6. The display of claim 1, wherein the interference filter layer comprises a bandpass interference filter layer.

7. The display of claim 6, wherein the bandpass interference filter layer comprises different interference layer regions with different passbands.

8. The display of claim 6, wherein the bandpass interference filter layer comprises:
a set of red-tuned interference layer regions with a passband substantially tuned for red light,
a set of green-tuned interference layer regions with a passband substantially tuned for green light, and
a set of blue-tuned interference layer regions with a passband substantially tuned for blue light.

9. The display of claim 8,
wherein each light-emitting element underlies a corresponding interference layer region,
and
wherein:
the light-emitting elements underlying the red-tuned interference layer regions are configured to emit substantially red light,
the light-emitting elements underlying the green-tuned interference layer regions are configured to emit substantially green light, and
the light-emitting elements underlying the blue-tuned interference layer regions are configured to emit substantially blue light.

10. The display of claim 1,
wherein the optical layer is a substantially two-dimensional array of converging lenses,
wherein the interference filter layer comprises a bandpass interference filter layer,
wherein the bandpass interference filter layer comprises different interference layer regions with different passbands, and
wherein each interference layer region corresponds to a respective one of the converging lenses.

11. The method of claim 1, wherein the first angle is defined relative to a line perpendicular to the light-emitting layer, and wherein the second angle is defined relative to a line perpendicular to the optical layer at a location the light hits the optical layer.

12. A method of operating a multiview display device, the method comprising:
selectively operating a light-emitting layer comprising an addressable array of light-emitting elements to emit light;
at an optical layer overlaying the light-emitting layer, using an array of lenses to substantially collimate light emitted from the light-emitting layer, wherein each respective lens overlays a group of light-emitting elements of the array of light-emitting elements and wherein light emitted from a light-emitting element of the group of light-emitting elements is collimated by the respective lens into a primary direction and collimated by another lens into a secondary direction; and
transmitting the light through an interference filter layer along an optical path from the light-emitting layer to an exterior of the display device, the interference filter layer being operative to substantially block the light collimated into the secondary direction and to substantially transmit the light collimated into the primary direction, wherein light is transmitted if emitted from the light-emitting layer with emission angle smaller than a first angle and is blocked if hit the optical layer with an incident angle larger than a second angle.

13. The method of claim 12, wherein the interference filter layer comprises:
a first coating on the flat lens surface of the optical layer, transmitting light from the light-emitting layer having an emission angle smaller than the first angle; and
a second coating on the curved lens surface of the optical layer, blocking light transmitted by the first coating having an incident angle greater than the second angle.

14. The method of claim 12,
wherein the optical layer is a substantially two-dimensional array of converging lenses,
wherein the interference filter layer comprises a bandpass interference filter layer,
wherein the bandpass interference filter layer comprises different interference layer regions with different passbands, and
wherein each interference layer region corresponds to a respective one of the converging lenses.

15. The method of claim 12, wherein the interference filter layer comprises a bandpass interference filter layer.

16. The method of claim 15, wherein the bandpass interference filter layer comprises:
a set of red-tuned interference layer regions with a passband substantially tuned for red light,
a set of green-tuned interference layer regions with a passband substantially tuned for green light, and
a set of blue-tuned interference layer regions with a passband substantially tuned for blue light.

17. The method of claim 12, wherein the first angle is defined relative to a line perpendicular to the light-emitting layer, and wherein the second angle is defined relative to a line perpendicular to the optical layer at a location the light hits the optical layer.

* * * * *